(12) United States Patent
Marks et al.

(10) Patent No.: US 10,005,571 B2
(45) Date of Patent: Jun. 26, 2018

(54) DEPLOYABLE SOLAR PANEL ARRAY FOR SPACECRAFT

(71) Applicants: Geoffrey W. Marks, Santa Barbara, CA (US); David J. Rohweller, Ojai, CA (US); Christian J. Pedersen, Ventura, CA (US)

(72) Inventors: Geoffrey W. Marks, Santa Barbara, CA (US); David J. Rohweller, Ojai, CA (US); Christian J. Pedersen, Ventura, CA (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 329 days.

(21) Appl. No.: 14/964,258

(22) Filed: Dec. 9, 2015

(65) Prior Publication Data
US 2016/0159500 A1    Jun. 9, 2016

Related U.S. Application Data

(60) Provisional application No. 62/089,651, filed on Dec. 9, 2014.

(51) Int. Cl.
| | | |
|---|---|---|
| *B64G 1/44* | (2006.01) | |
| *B64G 1/22* | (2006.01) | |
| *H02S 30/20* | (2014.01) | |

(52) U.S. Cl.
CPC ............ *B64G 1/443* (2013.01); *B64G 1/222* (2013.01); *H02S 30/20* (2014.12); *B64G 1/44* (2013.01)

(58) Field of Classification Search
CPC .......... B64G 1/443; B64G 1/222; B64G 1/44; H02S 30/20
See application file for complete search history.

(56) References Cited

U.S. PATENT DOCUMENTS

| | | | |
|---|---|---|---|
| 3,530,469 A | 9/1970 | Dailey et al. | |
| 3,532,299 A | 10/1970 | Williamson et al. | |
| 3,620,846 A * | 11/1971 | Paine et al. ............ | B64G 1/222 136/245 |

(Continued)

FOREIGN PATENT DOCUMENTS

| | | |
|---|---|---|
| CN | 104917450 A | 9/2015 |
| EP | 1270411 A1 | 1/2003 |

OTHER PUBLICATIONS

International Search Report for Application No. PCT/US2015/064804 dated Feb. 29, 2016.

*Primary Examiner* — Brian M O'Hara
(74) *Attorney, Agent, or Firm* — Tarolli, Sundheim, Covell & Tummino LLP

(57) ABSTRACT

A solar panel assembly for a spacecraft includes a bracket and first and second booms each having a first end secured to the bracket and a second end extending away from the bracket. Each boom is formed from a plurality of tubes that telescope between a stowed condition nested within one another and a deployed condition aligned end-to-end with one another. A solar panel is secured to the first and second booms for receiving solar energy and converting the solar energy to electrical power. The solar panel has a stowed condition collapsed between the first and second booms and a deployed condition extending in a plane between the first and second booms.

19 Claims, 29 Drawing Sheets

(56) References Cited

U.S. PATENT DOCUMENTS

| | | |
|---|---|---|
| 3,627,585 A | 12/1971 | Dollery et al. |
| 3,735,943 A | 5/1973 | Fayet |
| 3,973,745 A | 8/1976 | Coltrin et al. |
| 5,244,508 A | 9/1993 | Colozza |
| 7,913,953 B2 * | 3/2011 | Ellinghaus ............. B64G 1/407 |
| | | 244/159.6 |

* cited by examiner

DEPLOYABLE SOLAR PANEL ARRAY FOR SPACECRAFT

RELATED APPLICATIONS

This application claims priority to U.S. Provisional Application No. 62/089,651, filed 9 Dec. 2014, the entirety of which is incorporated herein by reference.

TECHNICAL FIELD

The disclosure relates to a deployable solar panel assembly for use on a spacecraft, such as on a satellite.

SUMMARY

In one example, a solar panel assembly for a spacecraft includes a bracket and first and second booms each having a first end secured to the bracket and a second end extending away from the bracket. Each boom is formed from a plurality of tubes that telescope between a stowed condition nested within one another and a deployed condition aligned end-to-end with one another. A solar panel is secured to the first and second booms for receiving solar energy and converting it to electrical power. The solar panel has a stowed condition collapsed between the first and second booms and a deployed condition extending in a plane between the first and second booms.

In another example, a solar panel assembly for a spacecraft includes a bracket and first and second booms each having a first end secured to the bracket and a second end extending away from the bracket. The booms are formed from a plurality of rectangular tubes that telescope between a stowed condition nested within one another and a deployed condition aligned end-to-end with one another with the first boom extending perpendicular to the second boom. A triangular solar panel is secured to the first and second booms for receiving solar energy and converting it to electrical power. The solar panel has a stowed condition collapsed between the first and second booms and a deployed condition extending in a plane between the first and second booms. The first and second booms extend parallel to one another and form a protective cover around the solar panel when the solar panel is in the stowed condition.

In another example, a spacecraft includes a pair of solar panel assemblies, each including a bracket and first and second booms. Each boom has a first end secured to the bracket and a second end extending away from the bracket. Each boom is formed from a plurality of tubes that telescope between a stowed condition nested within one another and a deployed condition aligned end-to-end with one another. A solar panel is secured to the first and second booms for receiving solar energy and converting it to solar power. The solar panel has a stowed condition collapsed between the first and second booms and a deployed condition extending in a plane between the first and second booms. Connecting arms are pivotably connected with each bracket and pivotably connected to the spacecraft such that the solar panel assemblies are movable to positions stacked atop one another on the spacecraft.

DETAILED DESCRIPTION

Figure 1:
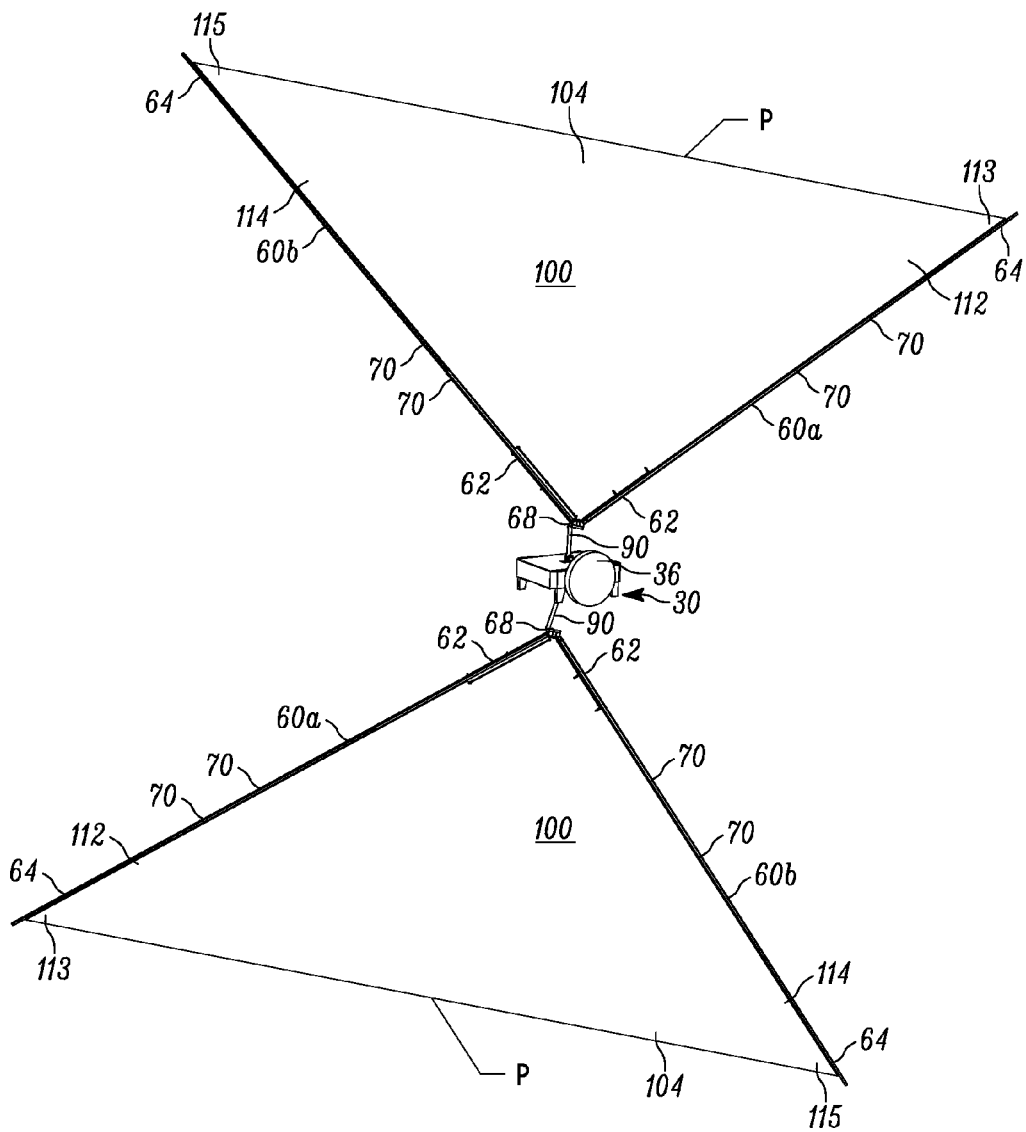
FIG. 1 is a schematic illustration of an example spacecraft having a pair of deployed solar panel assemblies.

FIGS. 1-11 illustrate an example a spacecraft 30 with one or more deployable solar panel assemblies 50. The spacecraft 30 can constitute, for example, a satellite that orbits around a celestial body and includes an antenna 36. Referring to FIG. 1, a spacecraft 30 having multiple solar panel assemblies 50 is illustrated. Although two solar panel assemblies 50 are shown it will be appreciated that more or fewer solar panel assemblies can be provided on the spacecraft 30. Each solar panel assembly 50 includes a plurality of booms 60a, 60b and a solar blanket or panel 100 secured to the booms. Each boom 60a, 60b extends from a first end 62 to a second end 64. The first end 62 of each boom 60a, 60b is connected to a bracket 68.

Figure 2A:
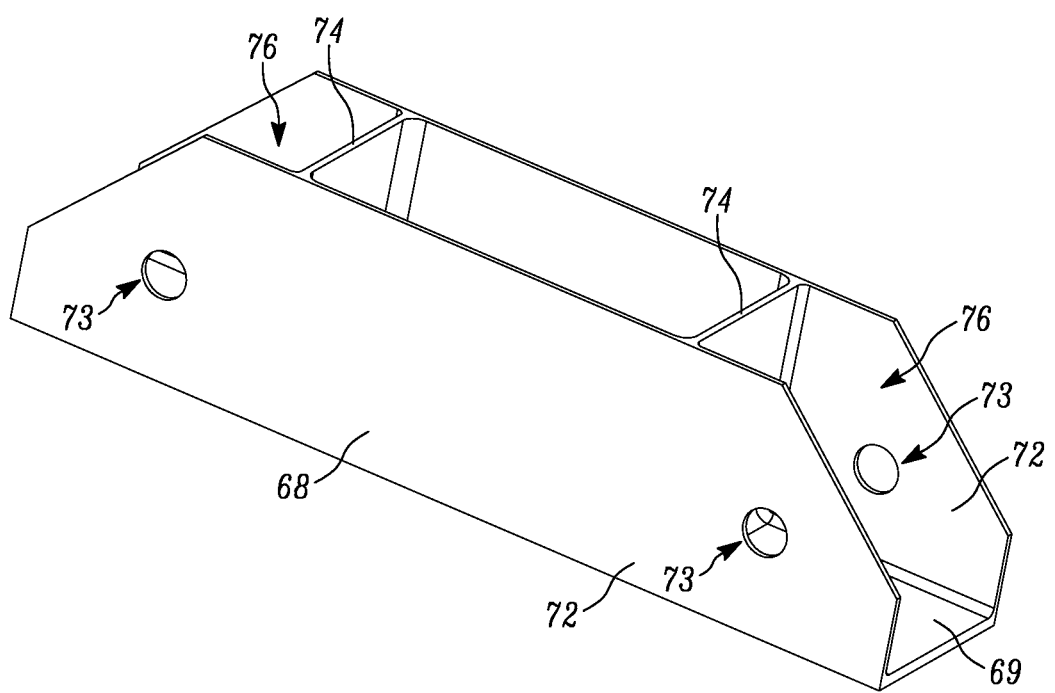
FIGS. 2A-2B are schematic illustrations of a bracket of the solar panel assembly of FIG. 1.
Figure 2B:
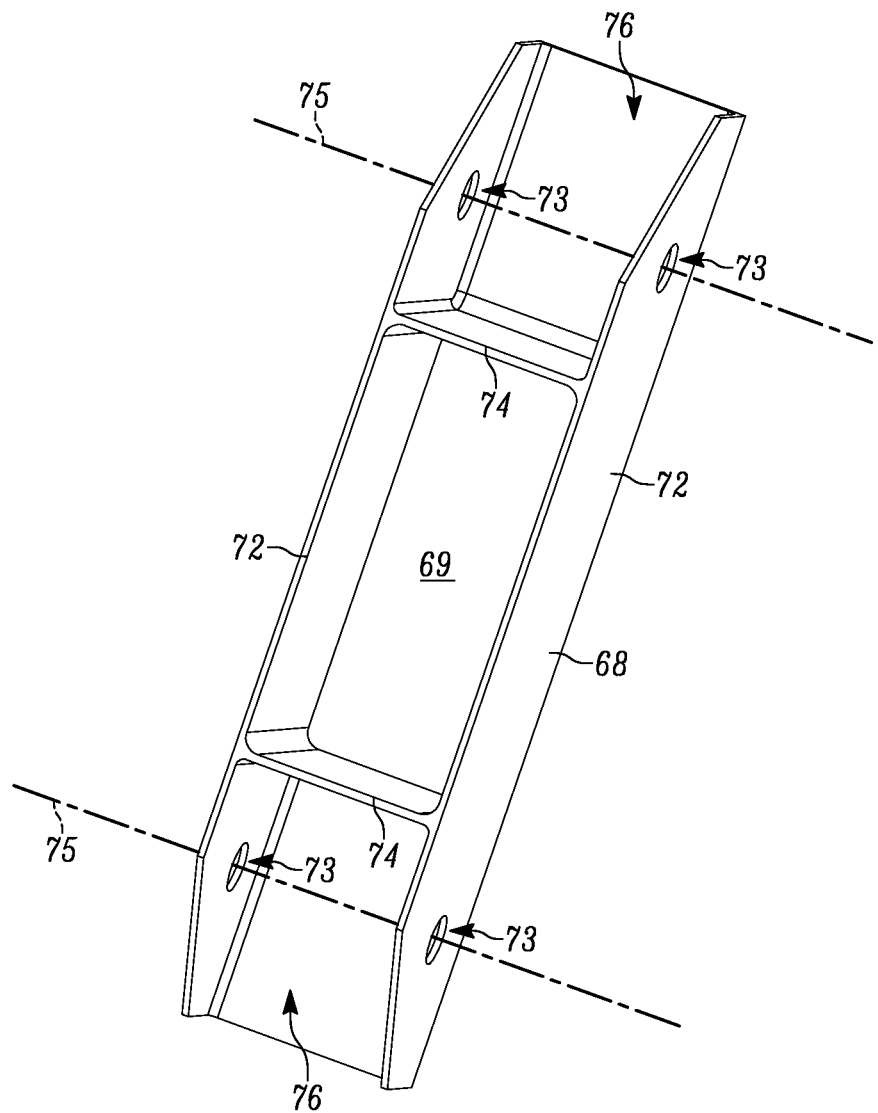

An example bracket 68 is illustrated in FIGS. 2A-2B. The bracket 68 is elongated and includes a base 69 having a square or rectangular shape. A pair of walls 72 extends perpendicularly in the same direction from the base 69. An opening 73 is provided in each end of each wall 72. Each pair of openings 73 in opposing walls 72 is aligned along an axis 75 at each end of the bracket 68. A pair of interior walls 74 extends between the walls 72 and between the aligned pairs of openings 73. The interior walls 74 can extend perpendicular to the walls 72 and the base 69. The walls 72, 74 cooperate with the base 69 to define a pair of receiving spaces 76 at each end of the bracket 68. The openings 73 extend into the receiving spaces 76.

As shown in FIG. 1, a connecting arm or member 90 secures each bracket 68 to the spacecraft 30. In particular, each connecting arm 90 includes a first end 92 secured to the bracket 68 and a second end 94 secured to the spacecraft 30 (see FIG. 5). The first end 92 of each connecting arm 90 is pivotably connected to the bracket 68 by a hinge 96. The hinge 96 allows each bracket 68 and, thus, allows the booms 60a, 60b secured thereto, to pivot relative to the corresponding connecting arm 90 in the manner indicated generally by the arrow $R_1$ (see FIG. 4A). Similarly, the second end 94 of each connecting arm 90 is pivotably connected to the spacecraft 30 by a hinge 98 that allows the connecting arms to pivot relative to the spacecraft in the manner indicated generally by the arrow $R_2$ (see FIG. 4B).

Figure 5:
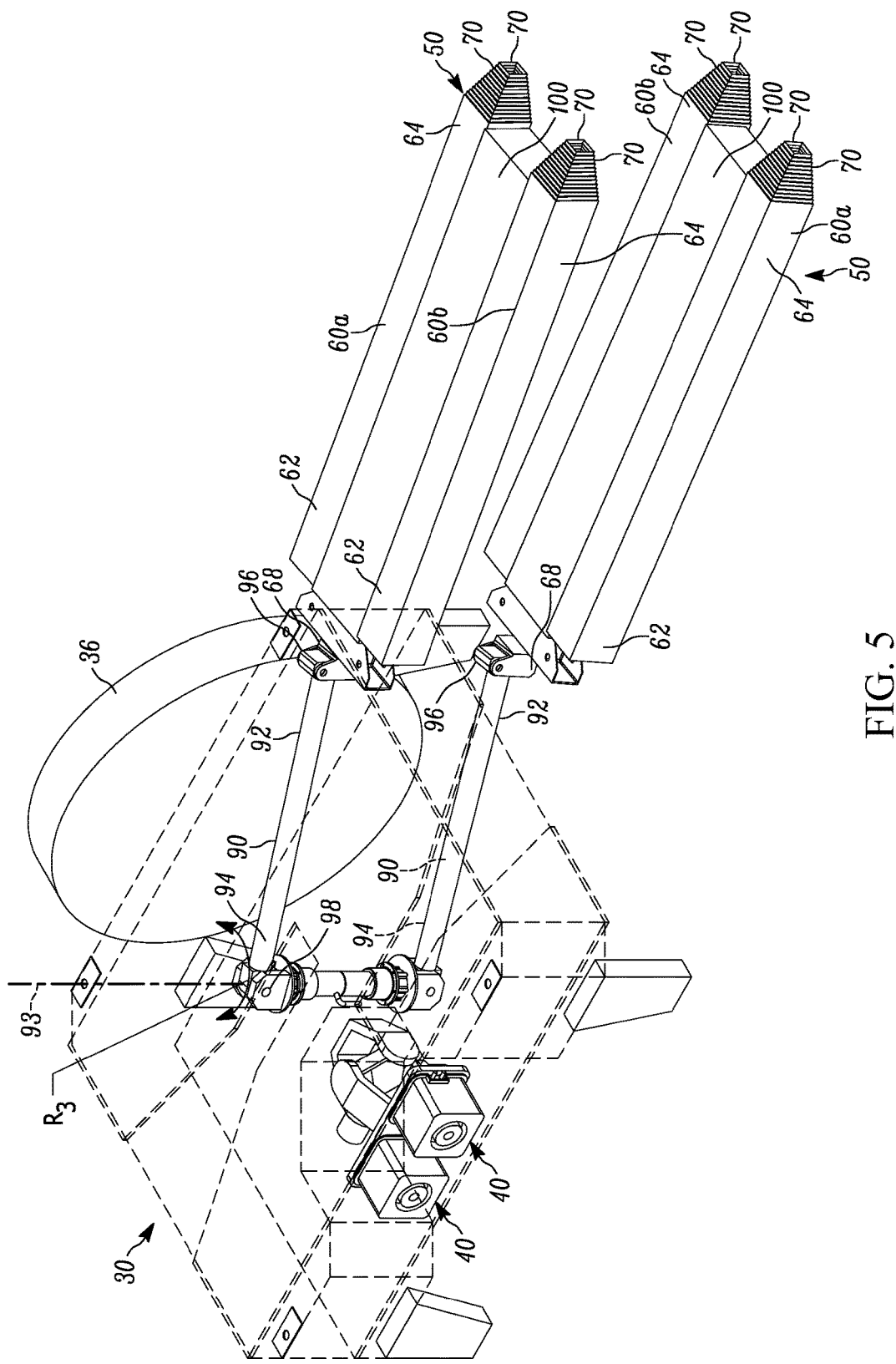
FIG. 5 is a schematic illustration of a first step of deployment of the solar panel assemblies of FIG. 1.

The hinges 96, 98 also allow each connecting arm 90 to pivot relative to the spacecraft 30 about an axis 93 extending through the spacecraft in the manner indicated generally by the arrow $R_3$ (see FIG. 5). One or more drive motors (not shown) connected to the spacecraft 30 are operable to move the booms 60a, 60b and the connecting arms 90 via the hinges 96, 98 in any of the directions $R_1$-$R_3$.

Figure 3:
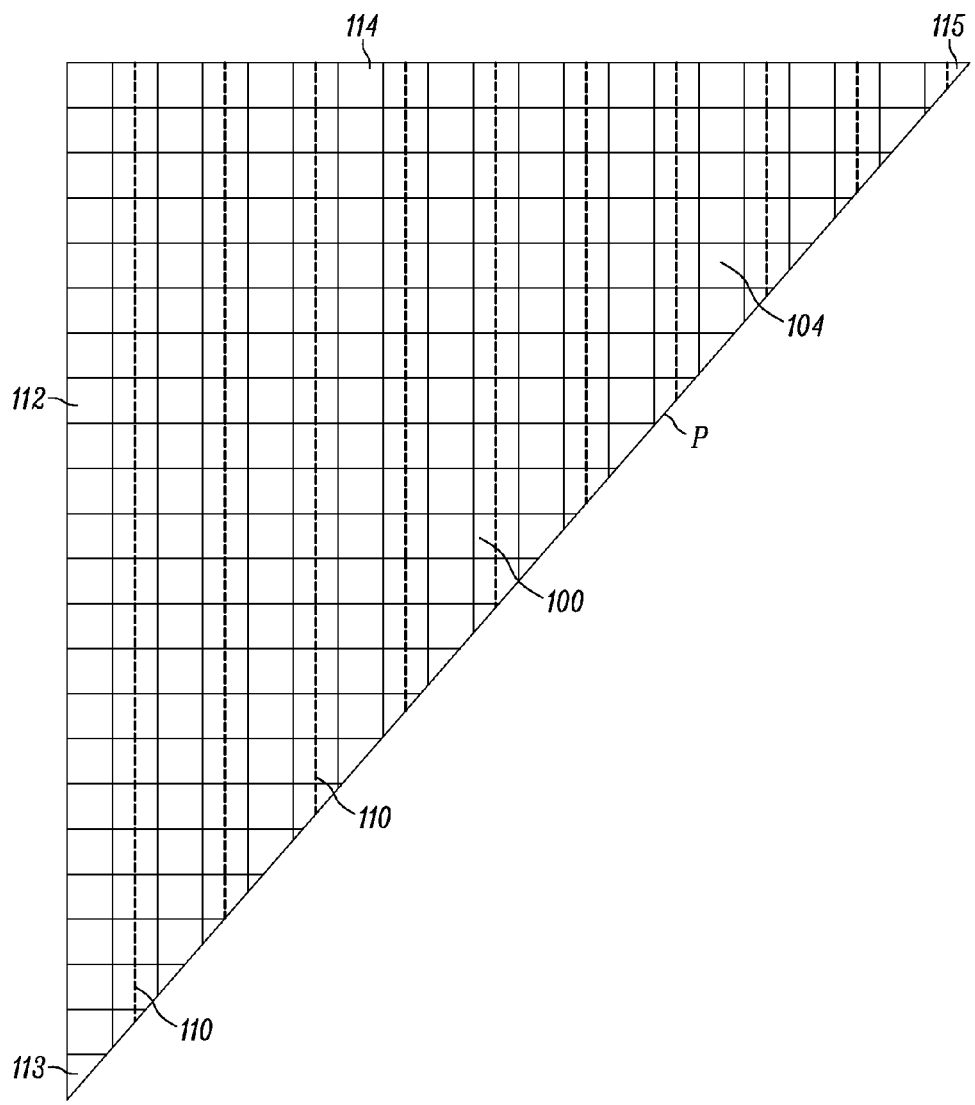
FIG. 3 is schematic illustration of a solar panel of the solar panel assembly of FIG. 1.

Referring to FIG. 3, the solar panels 100 secured to each pair of booms 60a, 60b each constitutes an elastically deformable array or sheet of material for receiving and storing solar energy. In one example, each solar panel 100 includes a series of photovoltaic cells secured to a mesh blanket that cooperate to convert solar energy into electricity. Consequently, each solar panel 100 can be formed from a photovoltaic material, such as gallium-arsenide or crystalline silicon. The solar panels 100 can be configured to achieve power levels in excess of 250 kW. Each solar panel 100 can be individually constructed to provide a unique power level for the spacecraft 30. Consequently, the solar panels 100 can have the same or different constructions, e.g., different materials and sizes.

Each solar panel 100 has a triangular shape defined by a perimeter P and a pair of opposing faces or sides 104, 106. Each solar panel 1100 can have any triangular shape, e.g., right, isosceles, obtuse. An elongated edge or portion 112 extends along one side of the perimeter P and another edge or portion 114 extends along another side of the perimeter perpendicular to the portion 112. The portion 112 terminates at a terminal end 113 and the portion 114 terminates at a terminal end 115.

Each solar panel 100 is configured to have an expanded or deployed condition with a substantially planar contour and a collapsed or stowed condition with a substantially rectangular shape. To this end, each solar panel 100 is provided with longitudinal corrugations 110 extending parallel to one another to allow the solar panel to collapse in a first direction extending perpendicular to the corrugations, e.g., in a direction towards the portion 114. Each solar panel 100 is also configured to bend in a direction substantially perpendicular to the corrugations 110 at one or more hinges 120 (see FIG. 8). This allows the solar panel 100 to further collapse in a second direction extending parallel to the corrugations 110, e.g., in a direction towards the portion 112. The solar panel 100 is therefore collapsible in multiple directions similar to an accordion to minimize its stowed size.

The solar energy acquired by the solar panel assemblies 50 is stored and converted into electrical energy for powering various devices and/or systems on the spacecraft 30. In one example, the solar energy acquired by the solar panel assemblies 50 is used to power a propulsion system, such as a solar-electric propulsion (SEP) system 40 having propulsion thrusters (see FIG. 4A). In an SEP system, the acquired solar energy is used to charge a stored propellant, e.g., Xenon or iodine, to generate ionized propellant. The ionized propellant, in turn, is accelerated by an electric field to generate thrust and propel the spacecraft 30 to and along its orbit.

Referring back to FIG. 1, each boom 60a, 60b is formed from a series of concentric tubes 70 connected together in a telescoping manner. In one example, the tubes 70 have a rectangular or square cross-section. It will be appreciated, however, that the tubes 70 can alternatively have a round or polygonal shape, e.g., circular, elliptical, triangular or pentagonal. The booms 60a, 60b are configured to be nested within one another such that, in a stowed condition, each boom is about the size of the largest tube 70. This helps minimize the size of the stowed boom 60a, 60b. The booms 60a, 60b have a deployed condition aligned with one another in an end-to-end manner, each have a length substantially equal to the collective lengths of the tubes 70. The booms 60a, 60b are deployed using one or more drive motors (not shown) connected to the spacecraft 30. The tubes 70 can be hollow and formed from a lightweight, durable material suitable for space travel.

Referring to FIG. 3A, the right side receiving space 76 in the bracket 68 is configured to receive the first end 62 of the boom 60a. An axle (not shown) extends through the right side openings 73 and the first end 62 of the boom 60a to pivotably connect the boom 60a to the bracket 68 about the axis 75. Similarly, the left side receiving space 76 is configured to receive the first end 62 of the boom 60b. An axle (not shown) extends through the left side openings 73 and the first end 62 of the boom 60b to pivotably connect the boom 60b to the bracket 68 about the axis 75. The base 69 is secured to the first end 92 of the connecting arm 90 at the hinge 96 (see FIG. 5).

Figure 4A:
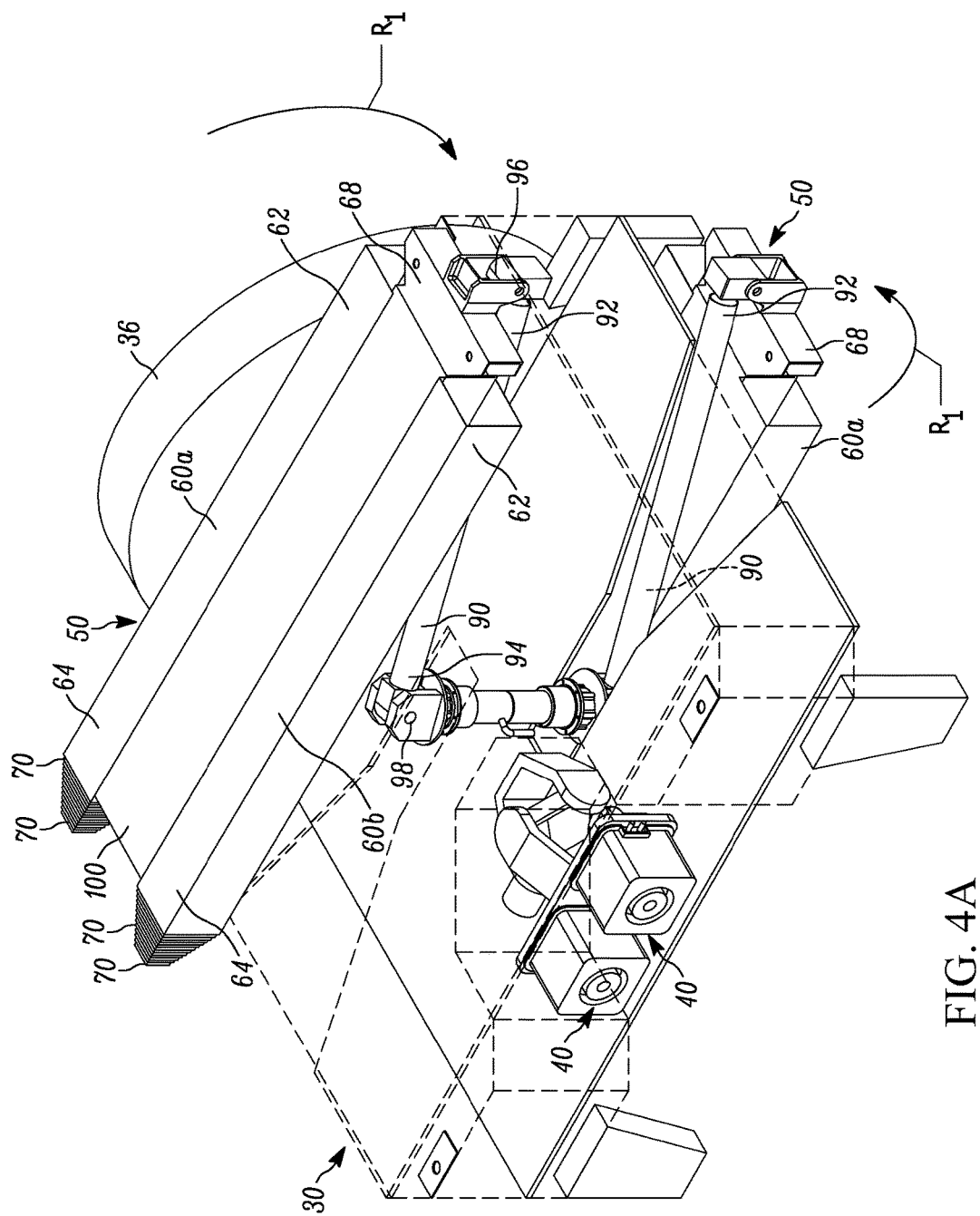
FIGS. 4A-4B are schematic illustrations of the solar panel assemblies of FIG. 1 in a stowed condition.
Figure 4B:
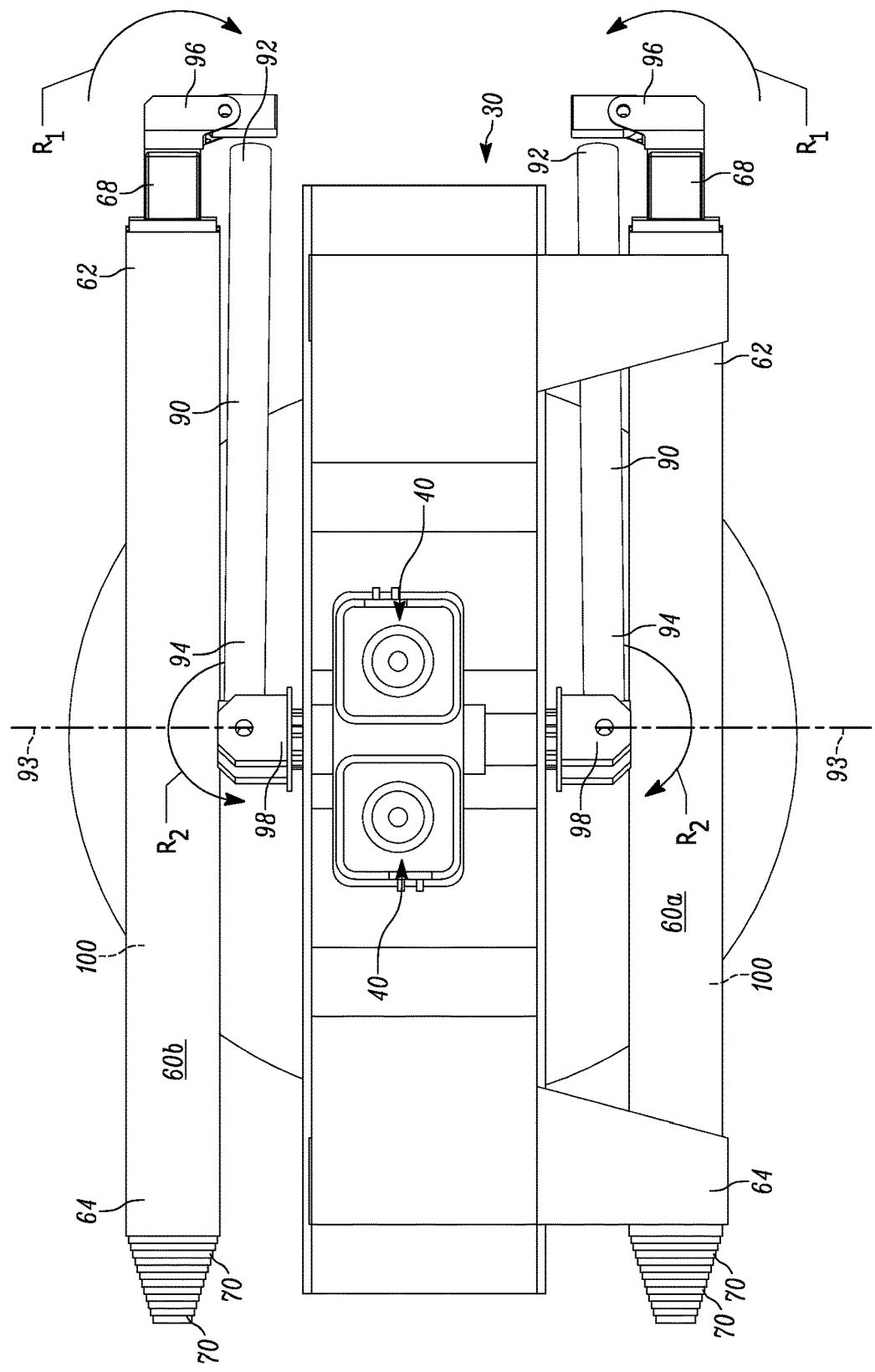

Referring to FIGS. 4A-4B, the booms 60a, 60b are initially stowed and the solar panels 100 secured to the booms along the portions 114, spanning the space between the booms. In this condition, the booms 60a, 60b of each solar panel assembly 50 extend parallel to each other. The solar panels 100 are collapsed between the booms 60a, 60b such that the stowed booms form a protective cover for the solar panel. In one example, the booms 60a, 60b enclose and fully compress the collapsed solar panel 100, which helps eliminate parasitic mass.

Figure 6:
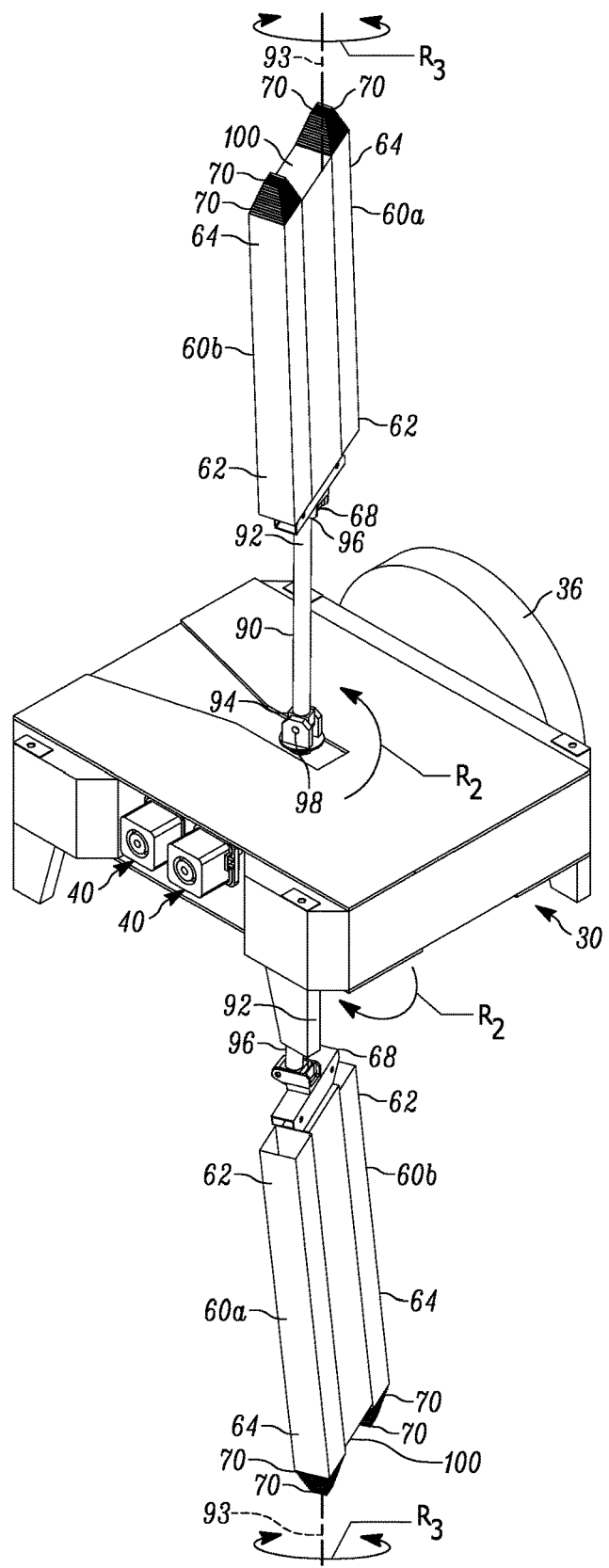
FIG. 6 is a schematic illustration of a second step of deployment of the solar panel assemblies of FIG. 1.

The pair of stowed solar panel assemblies 50 are stacked generally atop one another on opposite sides of the spacecraft 30. Each solar panel assembly 50 is deployed when it is desirable to power/propel the spacecraft 30. To this end, the stowed booms 60a, 60b and solar panel 100 on each solar panel assembly 50 are pivoted away from the spacecraft 30 at the hinges 96 in the direction $R_1$. This extends the solar panel assemblies 50 outward relative to the respective connecting arm 90 such that each solar panel assembly extends substantially coaxially with the connecting arm secured thereto (FIG. 5). The connecting arms 90 are then pivoted upward via the hinges 98 in the direction $R_2$ until each connecting arm extends in an opposite direction from the spacecraft 30 along its axis 93 (FIG. 6). The axes 93 can be coaxial (as shown) or the connecting arms 90 could extend parallel, transverse or perpendicular to one another when deployed (not shown).

Figure 7:
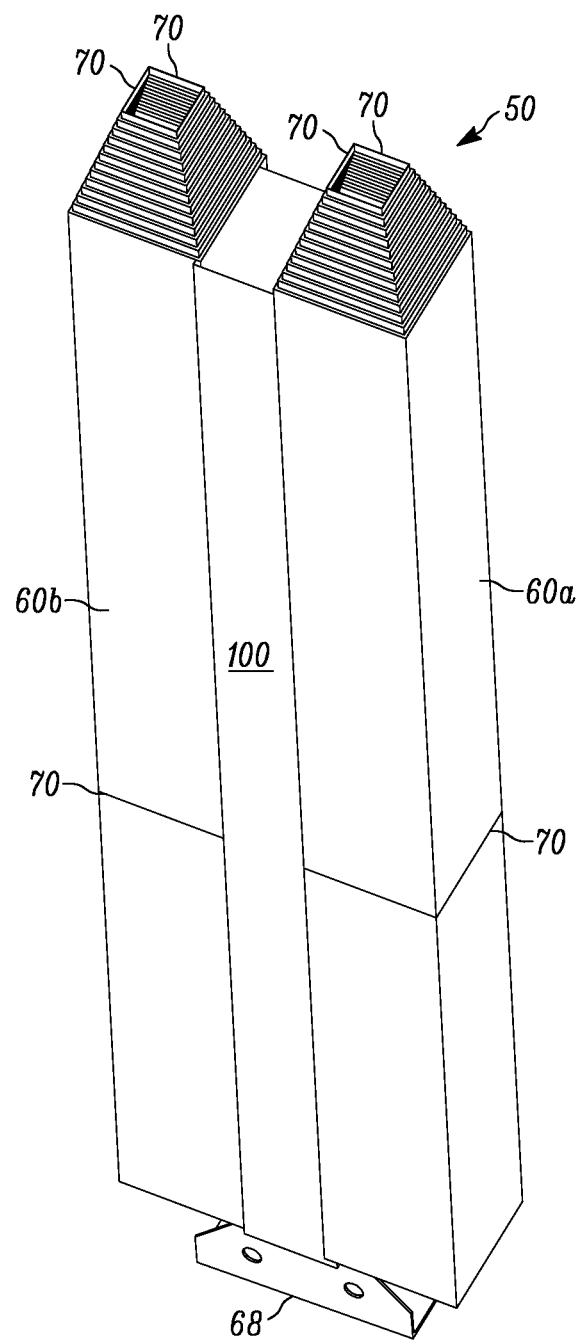
FIG. 7 is an enlarged view of a portion of FIG. 6.
Figure 8:
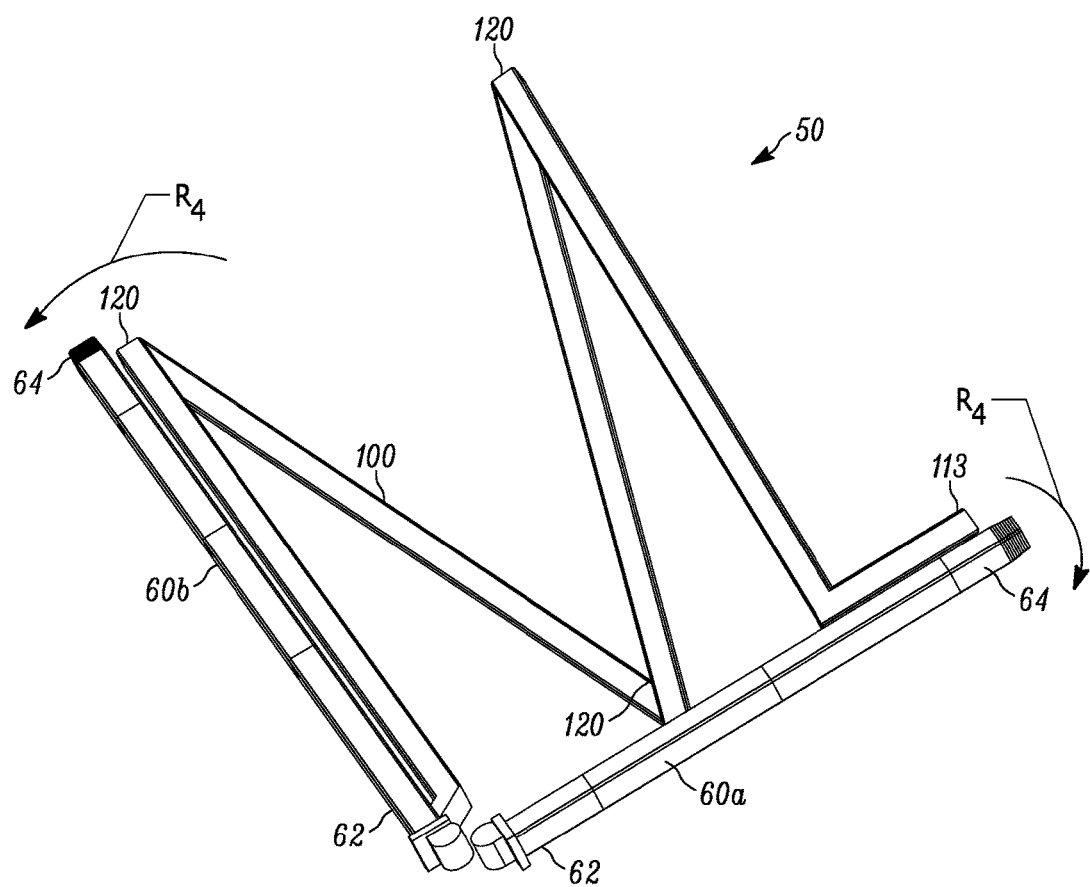
FIGS. 8-11 are schematic illustrations of various further stages of deployment of the solar panel assemblies of FIG. 1.

Referring to FIGS. 7-8, the booms 60a, 60b on each bracket 68 are then pivoted away from one another about the axles (not shown) in the openings 73 in the direction $R_4$ until the booms extend at an angle, e.g., substantially perpendicular, to one another. This orients the booms 60a, 60b in a v-shaped configuration. The solar panel 100 is secured to the booms 60a, 60b such that outward telescopic movement of the booms in this orientation deploys the solar panel. To this end, the edge portion 112 of the solar panel 100 is secured to the boom 60a. In particular, one or more of the solar panel hinges 120 are secured to the boom 60a, with the terminal end 113 of the solar panel 100 secured to the second end 64 of the boom 60a. The other edge portion 114 of the solar panel 100 opposite the edge portion 112 is secured to the boom 60b, with the terminal end 115 secured to the second end 64 of the boom 60b.

Figure 9:
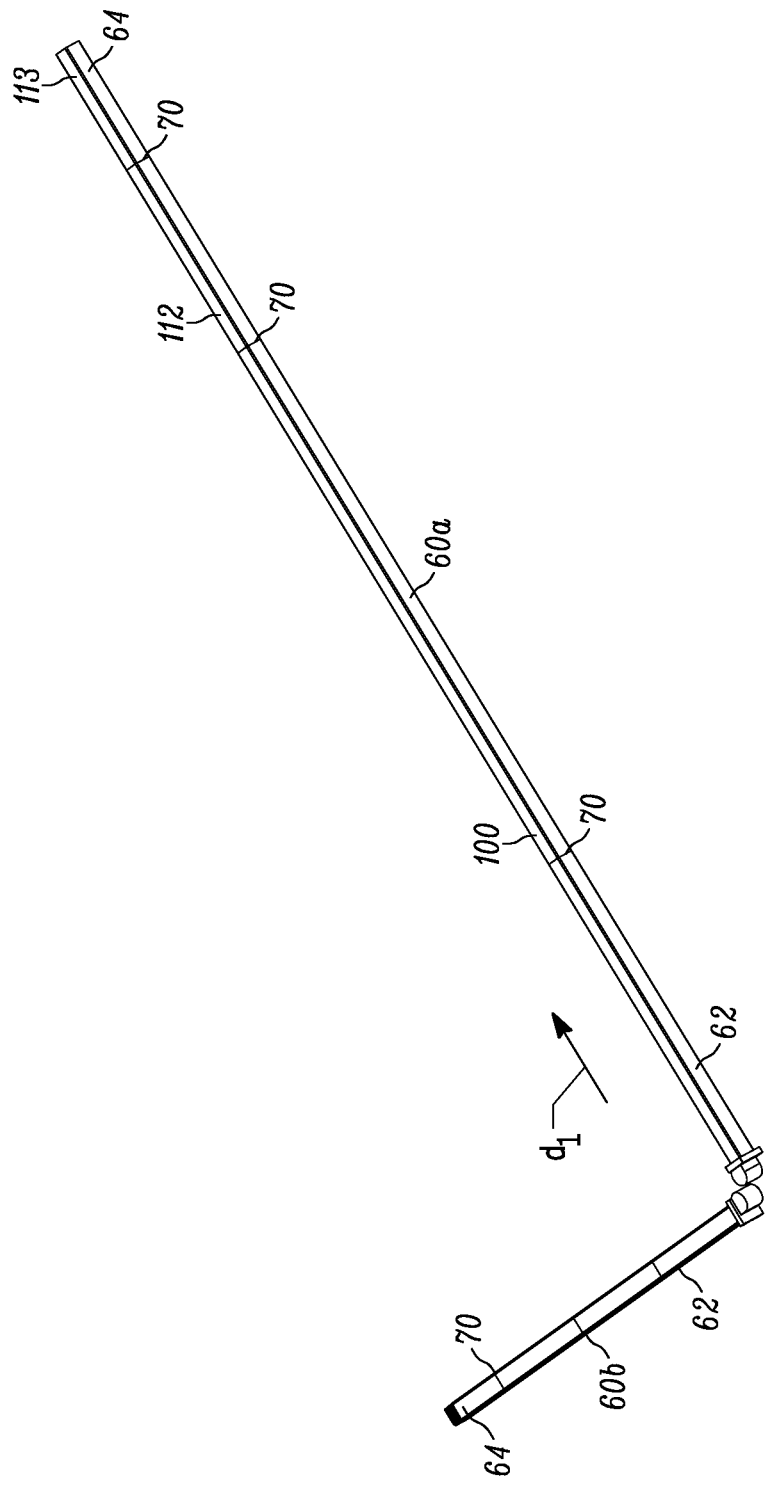
Figure 10:
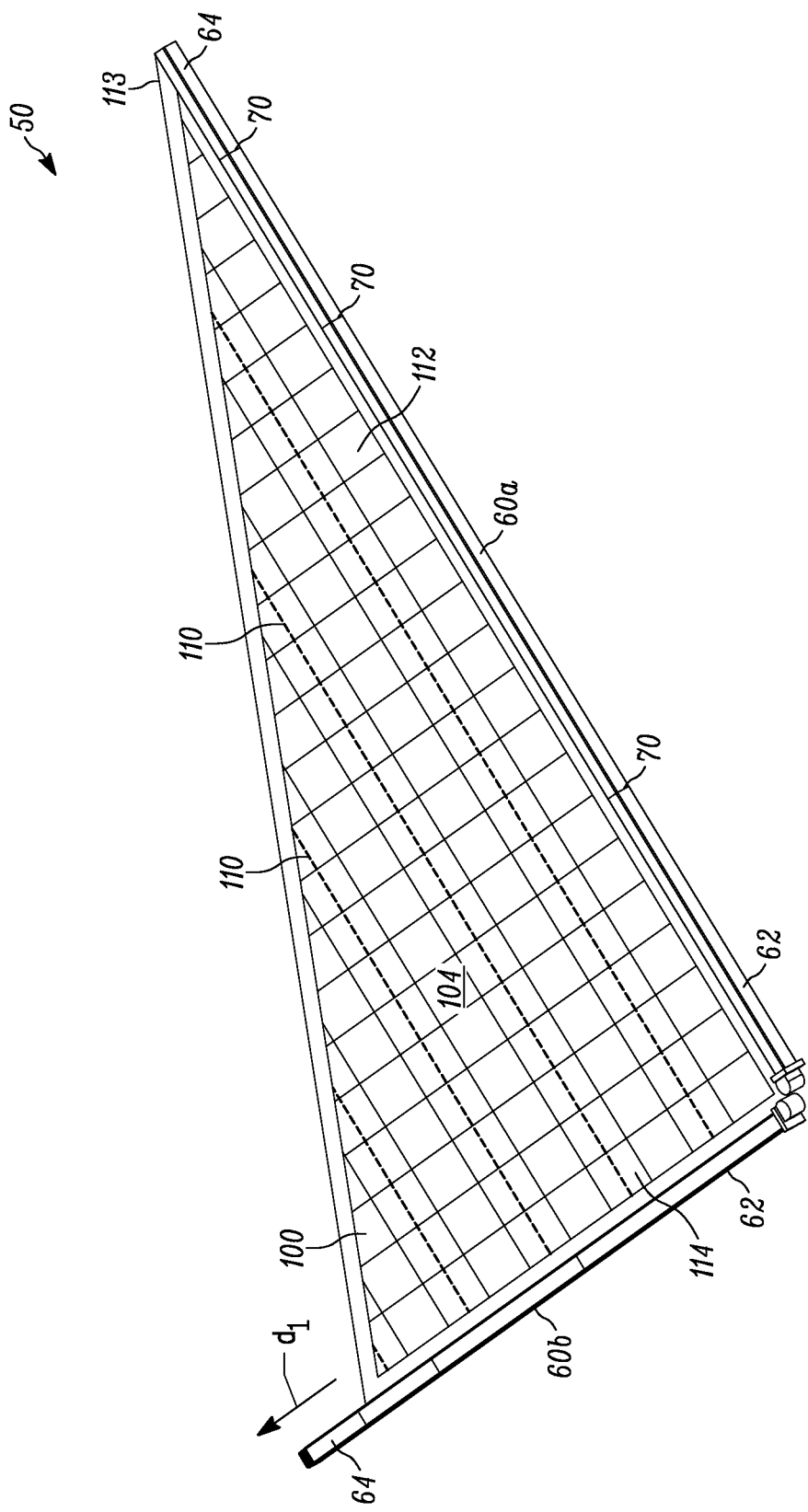
Figure 11:
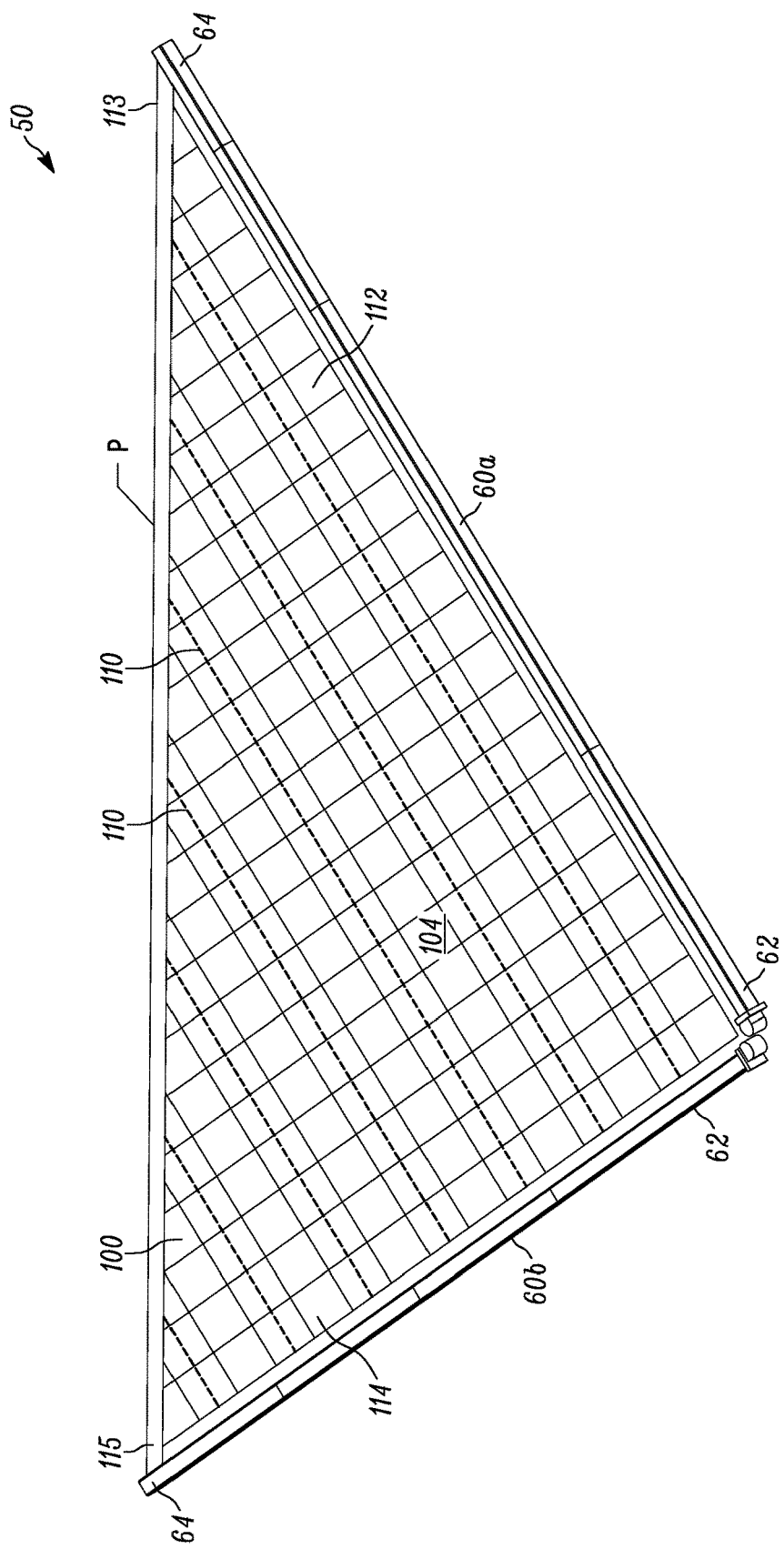

Due to this configuration, extending the boom 60a from the bracket 68 in the telescoping manner indicated by the arrow $d_1$ causes the solar panel 100 to expand at the hinges 120 to the configuration shown in FIG. 9. Thereafter extending the boom 60b from the bracket 68 in the telescoping manner $d_1$ (see FIG. 10) causes the solar panel 100 to expand at the corrugations 110 until the solar panel and booms 60a, 60b reach the fully deployed, planar condition shown in FIG. 11. The booms 60a, 60b are therefore sequentially extended to deploy the solar panel 100. As illustrated, the boom 60a is extended outward from the bracket 68 first, followed by the boom 60b. The booms 60a, 60b could, however, be extended simultaneously. This process is repeated for each solar panel assembly 50 on the spacecraft 30—either sequentially or simultaneously. In any case, the extended booms 60a, 60b maintain tension in each deployed solar panel 100. It is noted that the bracket 68 is omitted in FIGS. 8-11 at the ends 62 of the booms 60a, 60b for viewing purposes only.

FIG. 1 illustrates the state at which all solar panel assemblies 50 are fully deployed. Each solar panel 100 is fully tensioned between the booms 60a, 60b and presents the planar sides 104 towards the sun. The planar sides 106 face away from the sun. In this configuration, the solar panel assemblies 50 are configured to receive solar energy on the sides 104 of each solar panel 100. The solar energy acquired is converted to electrical power, which is transmitted to and stored in a spacecraft power system (not shown). The spacecraft power system, in turn, can transmit the electrical power to the SEP(s) 40 to propel the spacecraft 30 to and along its desired orbit.

Figure 12:
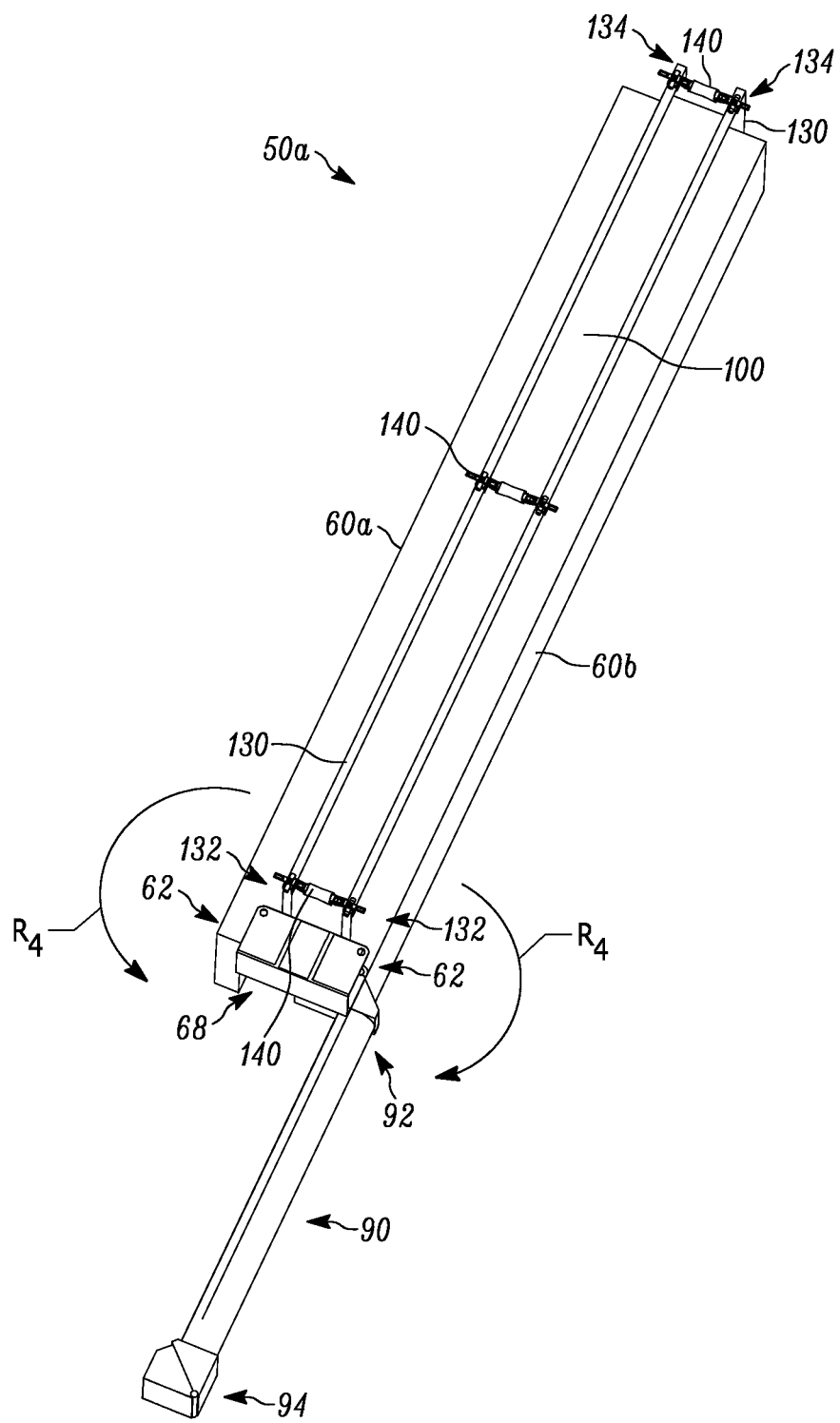
FIGS. 12-14 are schematic illustrates of another example solar panel assembly.
Figure 13:
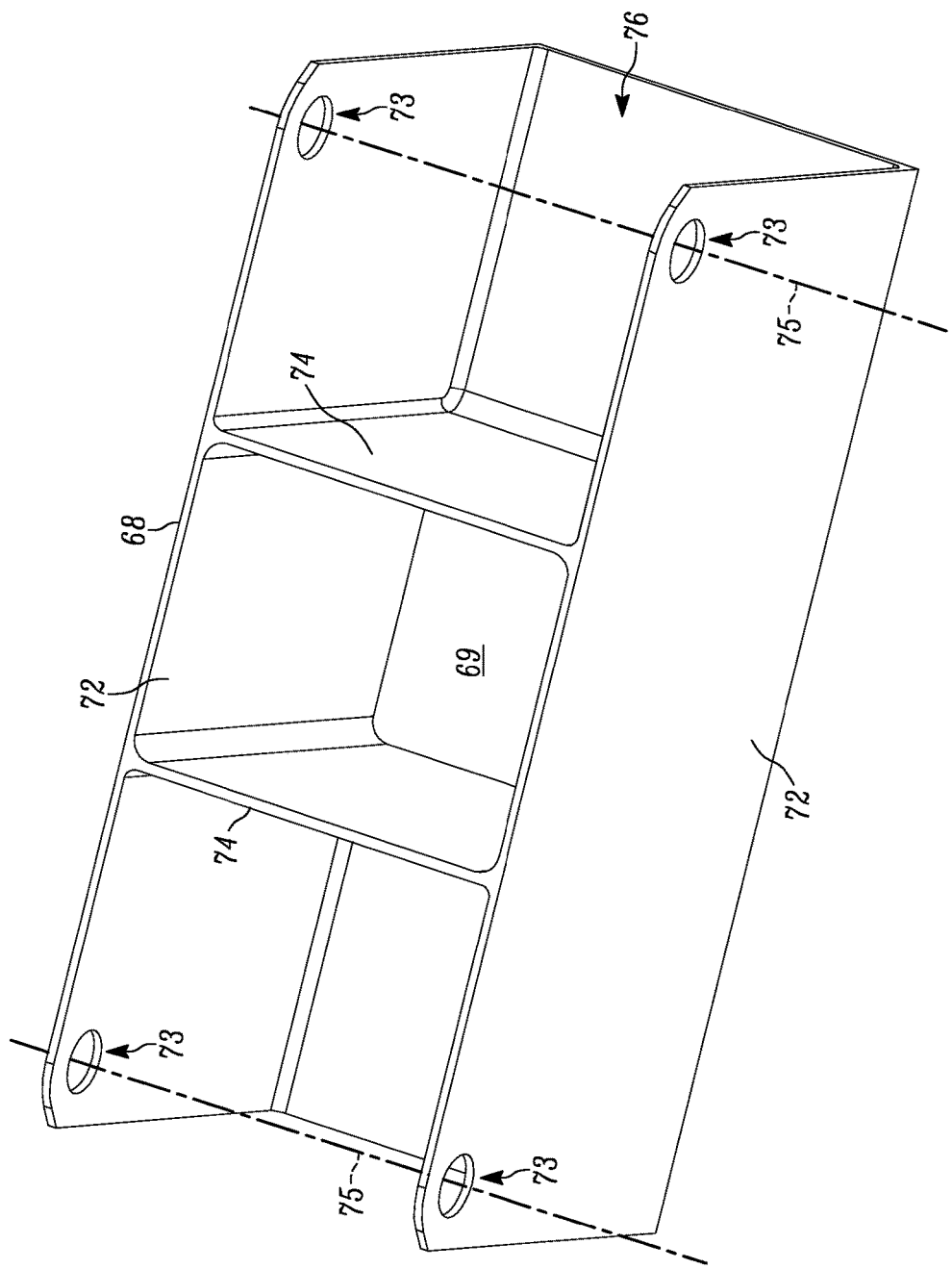
Figure 14:
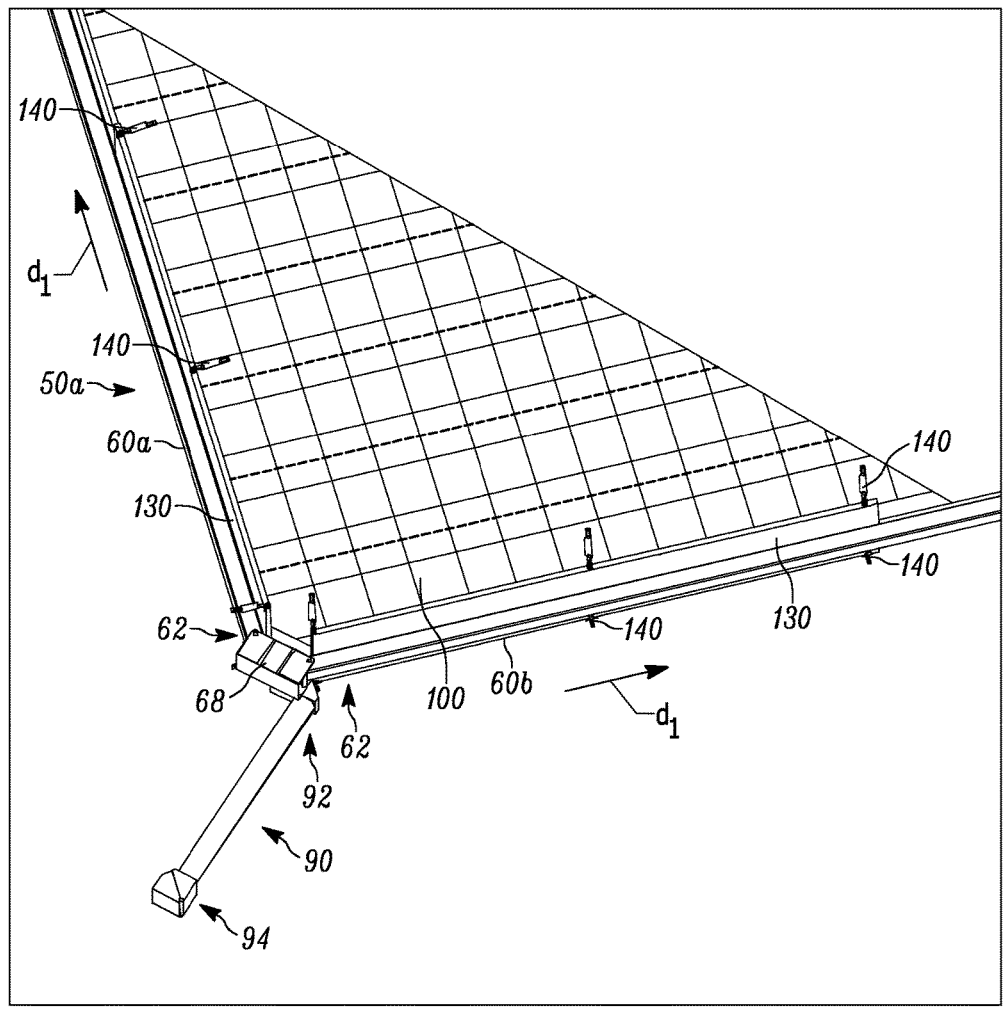

FIGS. 12-14 illustrate a modified configuration for a solar panel assembly 50a in which the solar panel 100 is secured to the booms 60a, 60b by a pair of plates 130. Features in FIGS. 12-14 that are similar or identical to features in FIGS. 1-11 are given the same reference numeral. In this configuration, a plate 130 is secured to each boom 60a, 60b and extends the length of the stowed booms, i.e., each plate is the length of the largest tube 70. Each plate 130 extends from a first end 132 secured to the first end 62 of the respective boom 60a, 60b to a second end 134 adjacent the longitudinal end of the stowed boom. Consequently, the plates 130 extend parallel to the booms 60a, 60b.

The plates 130 are positioned between the booms 60a, 60b and face one another. The blanket 100 is secured to each plate 130 and spans the space between them. The connecting arm 90 has one end 92 secured to the bracket 68 and the other end 94 secured to the spacecraft (not shown) in the manner previously described.

Referring to FIG. 12, the stowed booms 60a, 60b extend parallel to one another and the plates 130 cooperate to form the protective cover for the solar panel 100. To this end, the plates 130 can have a larger cross-section than the collapsed solar panel 100 to help protect the stowed solar panel. In any case, in this configuration the solar panel 100 is fully compressed and stowed between the plates 130 secured to the booms 60a, 60b.

A series of releasable fasteners 140 is provided along the length of the plates 130. The fasteners 140 are each connected to both plates 130 and act to keep the plates parallel to one another prior to deployment and, thus, keep the solar panel 130 stowed and protected prior to deployment. As shown, fasteners 140 connect both the top and bottom of the plates 130 together at and between both ends 132, 134 of the plates.

To deploy the solar panel 100, the fasteners 140 are released to allow the booms 60a, 60b—and plates 130 secured thereto—to move relative to another. This can be accomplished by electronic actuator (not shown) or when a predetermined tensile force is applied to the fasteners due to the booms 60a, 60b attempting to pivot away from one another. In either case, once the fasteners 140 are released the booms 60a, 60b are rotated about the bracket 68 in the direction $R_4$ until they extend substantially perpendicular to one another (FIG. 14). The booms 60a, 60b are then sequentially or simultaneously extended in the direction $d_1$ to expand the solar panel 100 about its hinges 120 until the solar panel assembly 50a reaches the fully deployed condition shown in FIG. 14.

FIGS. 15A-16B illustrate alternative configurations for solar panel assemblies 150, 250 in which more than two solar panels 100 are used. Features in FIGS. 15A-16B that are similar or identical to features in FIGS. 1-11 are given the same reference numeral. In these configurations, as well as the design of the booms 60a, 60b of FIGS. 1-11, it is desirable to minimize the mass of the booms 60a, 60b in order to achieve high specific mass performance of about 130 W/kg. The solar panel assemblies 150, 250 of FIGS. 15A-16B use three or more booms 60a, 60b. Each boom added can double the solar panel surface area, lower the mass moment of inertia, double the power output, and reduce the percentage of the boom weight to the total mass of the solar panel assembly, thereby increasing specific performance.

Figure 15A:
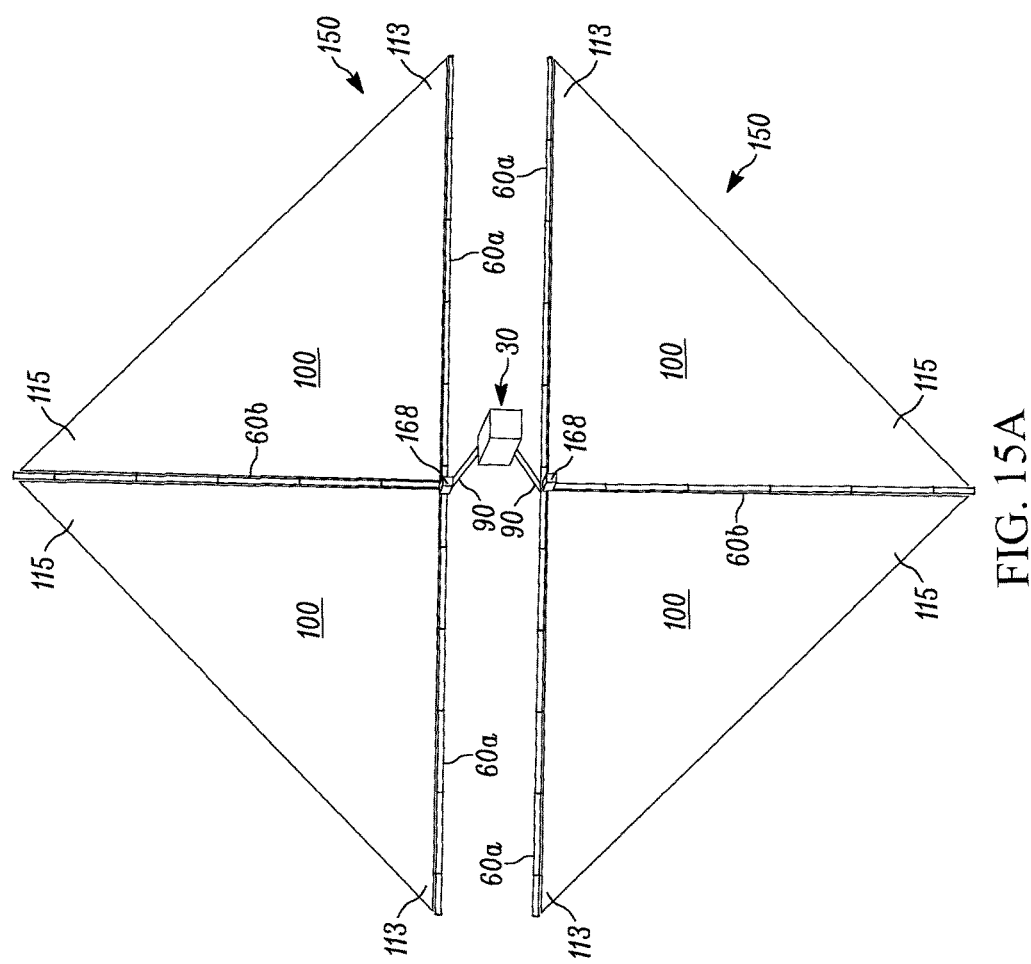
FIGS. 15A-15B are schematic illustrations of another example solar panel assembly.
Figure 15B:
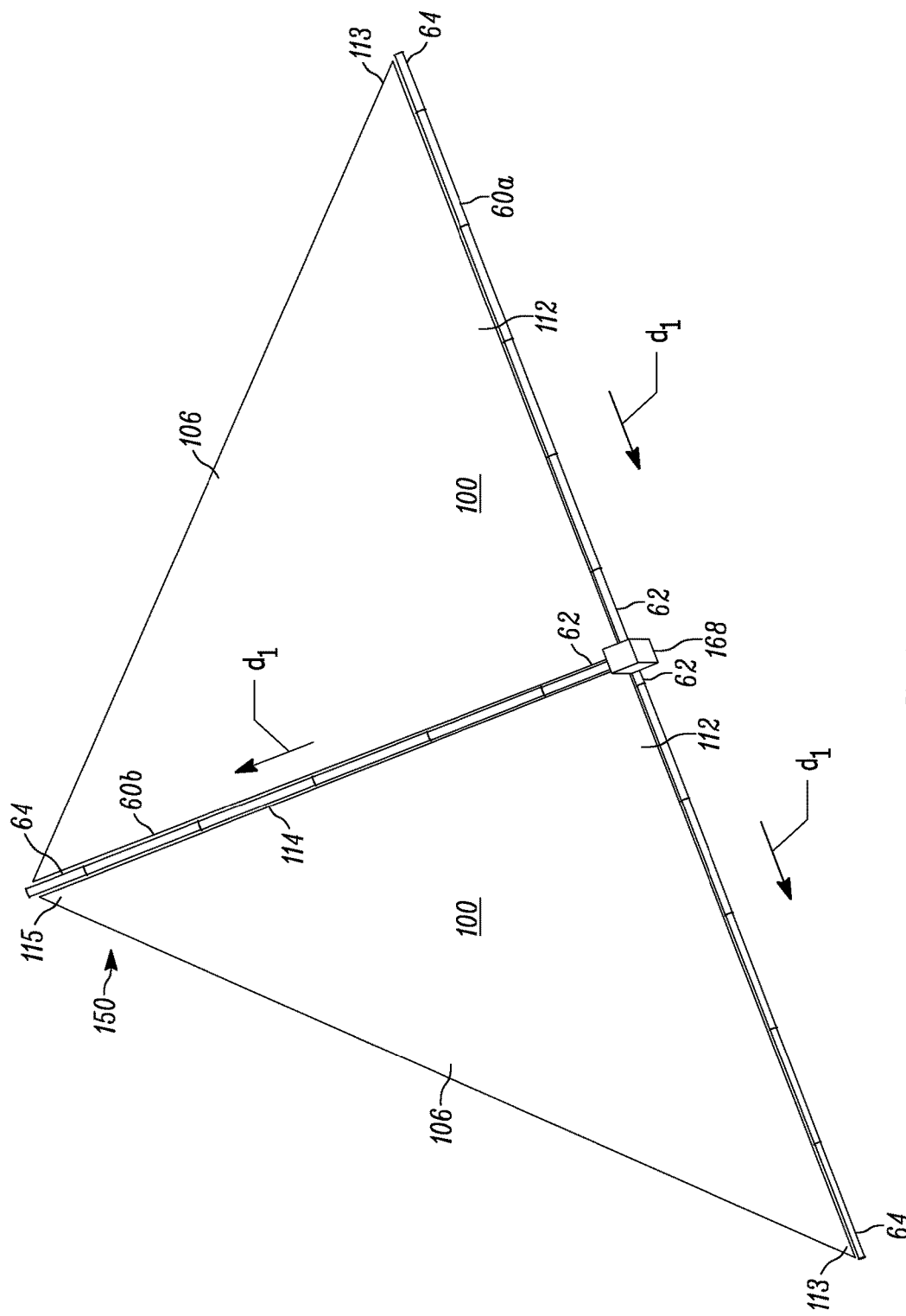

In FIGS. 15A-15B, the supporting booms collectively have a T-shaped configuration in which three booms 60a, 60b are used to support, deploy, and stow two solar panels 100 for each solar panel assembly on opposite sides of the spacecraft 30. The first end 62 of each boom 60a, 60b is secured to a bracket (not shown) to form the T-shaped structure in which each of the booms 60a extends substantially perpendicular to the central boom 60b. The edge portions 112 of the solar panels 100 are secured to the booms 60a in the same manner as the solar panel 100 is secured to the boom 60a in FIGS. 8-11. Similarly, the solar panels 100 are secured to the central boom 60b in the same manner as the solar panel 100 is secured to the boom 60b in FIGS. 8-11. The stowed booms 60a, 60b extend parallel to one another to form the protective cover for the solar panels 100 as previously described. Consequently, in this configuration the solar panels 100 are fully compressed and stowed between the booms 60a, 60b.

To deploy the solar panels 100, the booms 60a are sequentially or simultaneously extended in the direction $d_1$ to expand the solar panels 100 about their hinges 120. Extending the central boom 60b in the direction $d_1$ expands both solar panels 100 simultaneously about their corrugations 110 until the solar panel assemblies 150 reach the fully deployed condition shown in FIG. 12A.

Figure 16A:
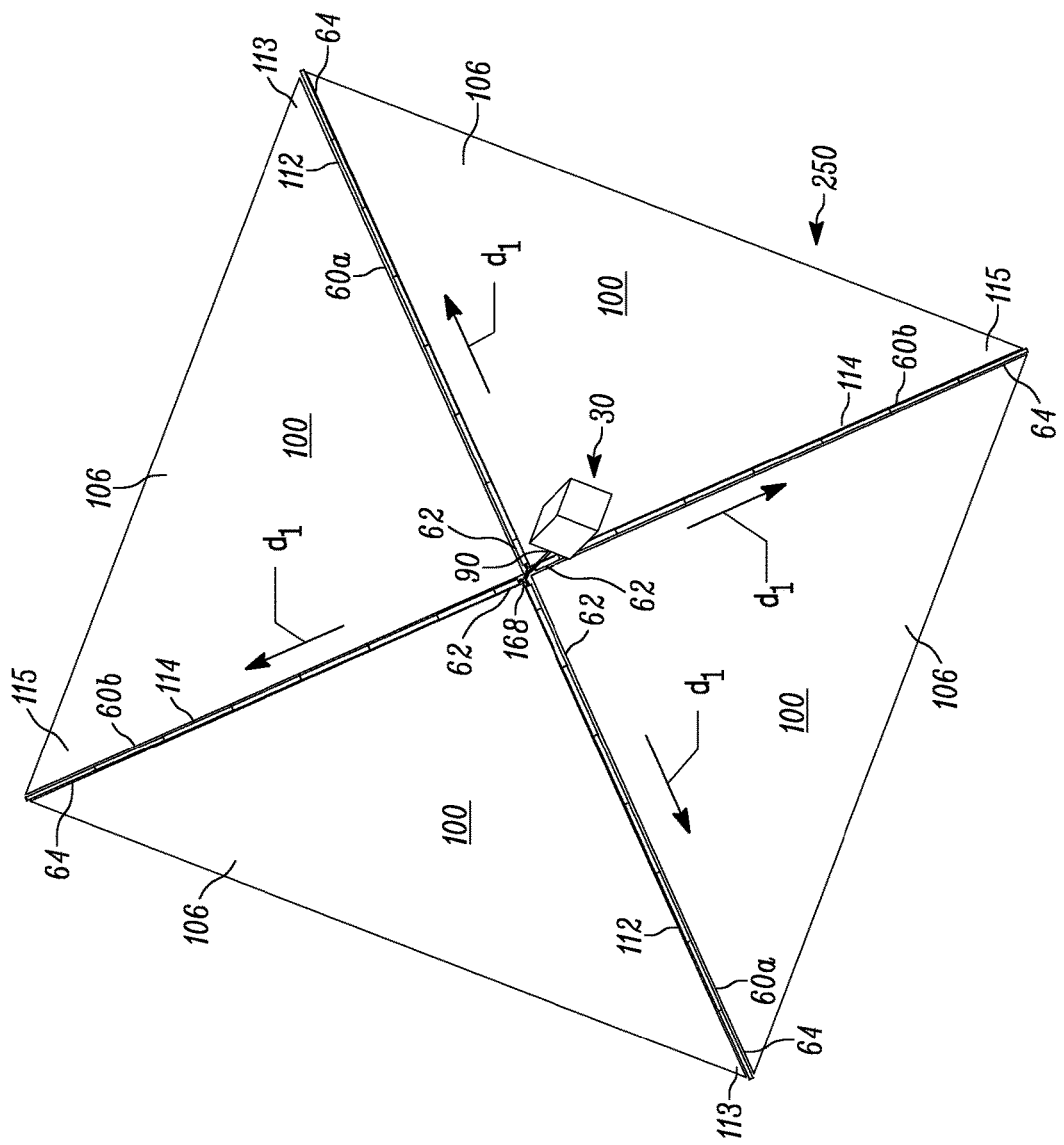
FIGS. 16A-16C are schematic illustrations of another example solar panel assembly.
Figure 16B:
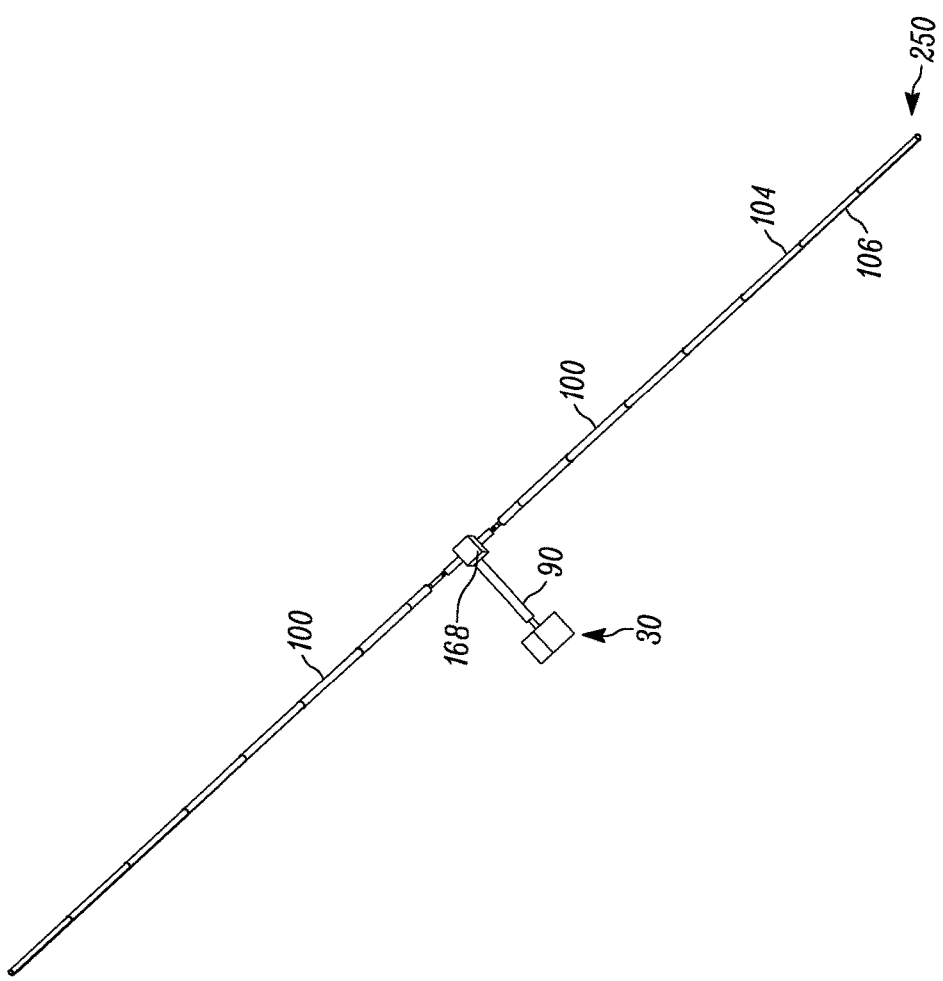
Figure 16C:
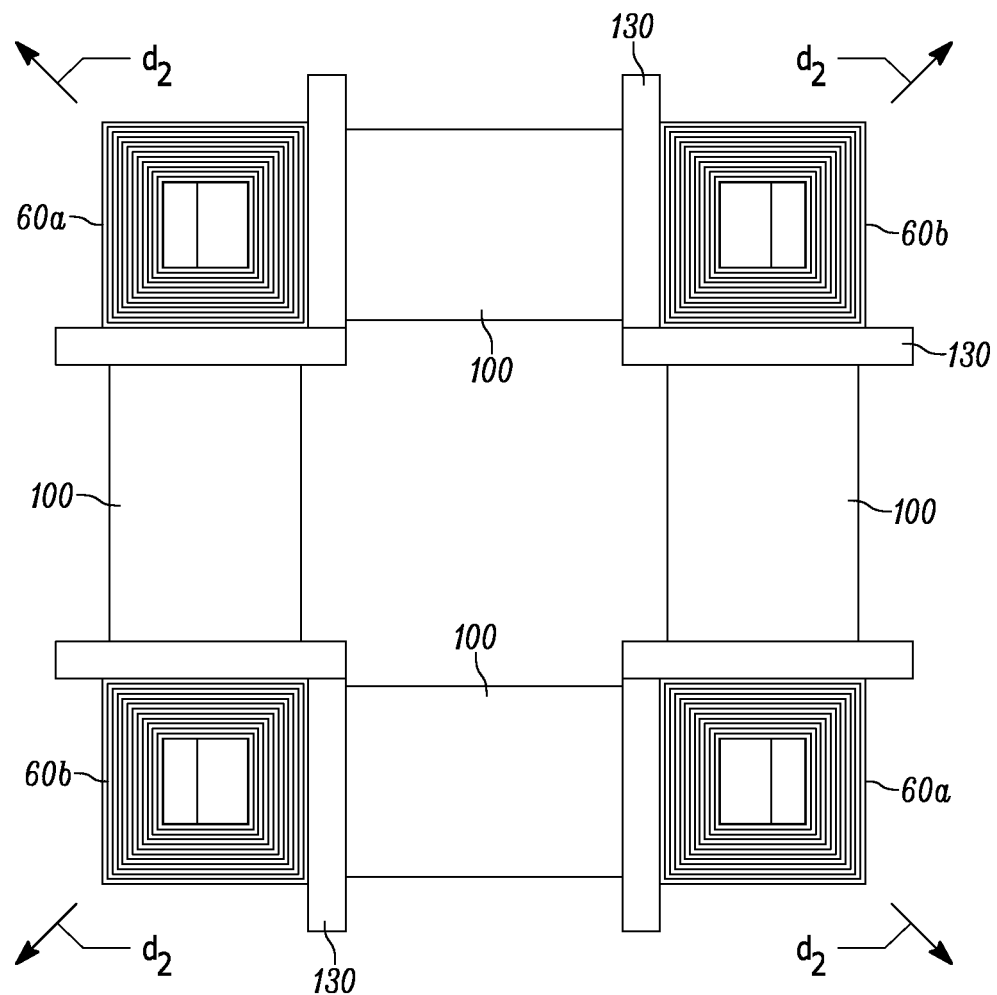
Figure 17:
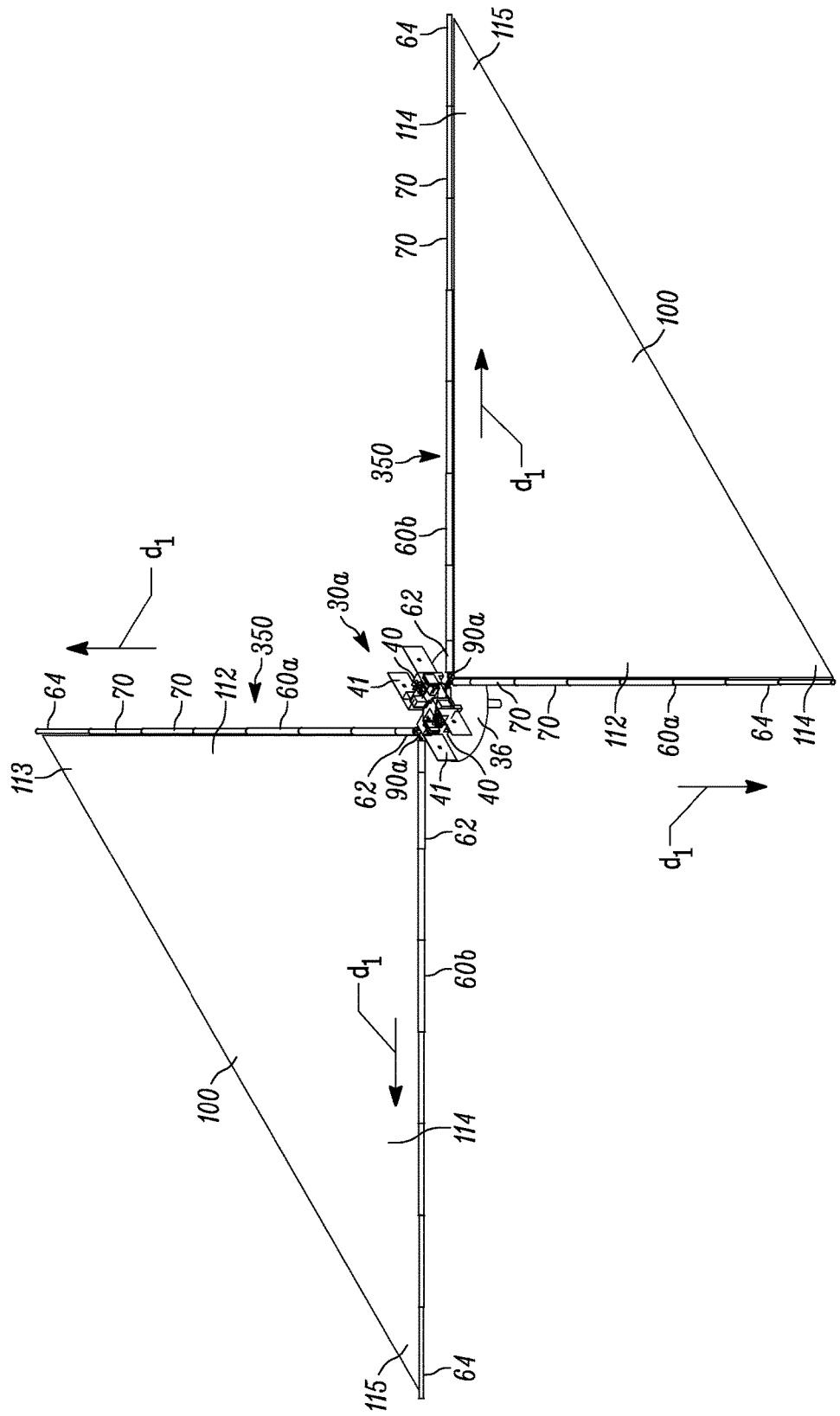
FIGS. 17-20D are schematic illustrations of another example solar panel assembly.
Figure 18:
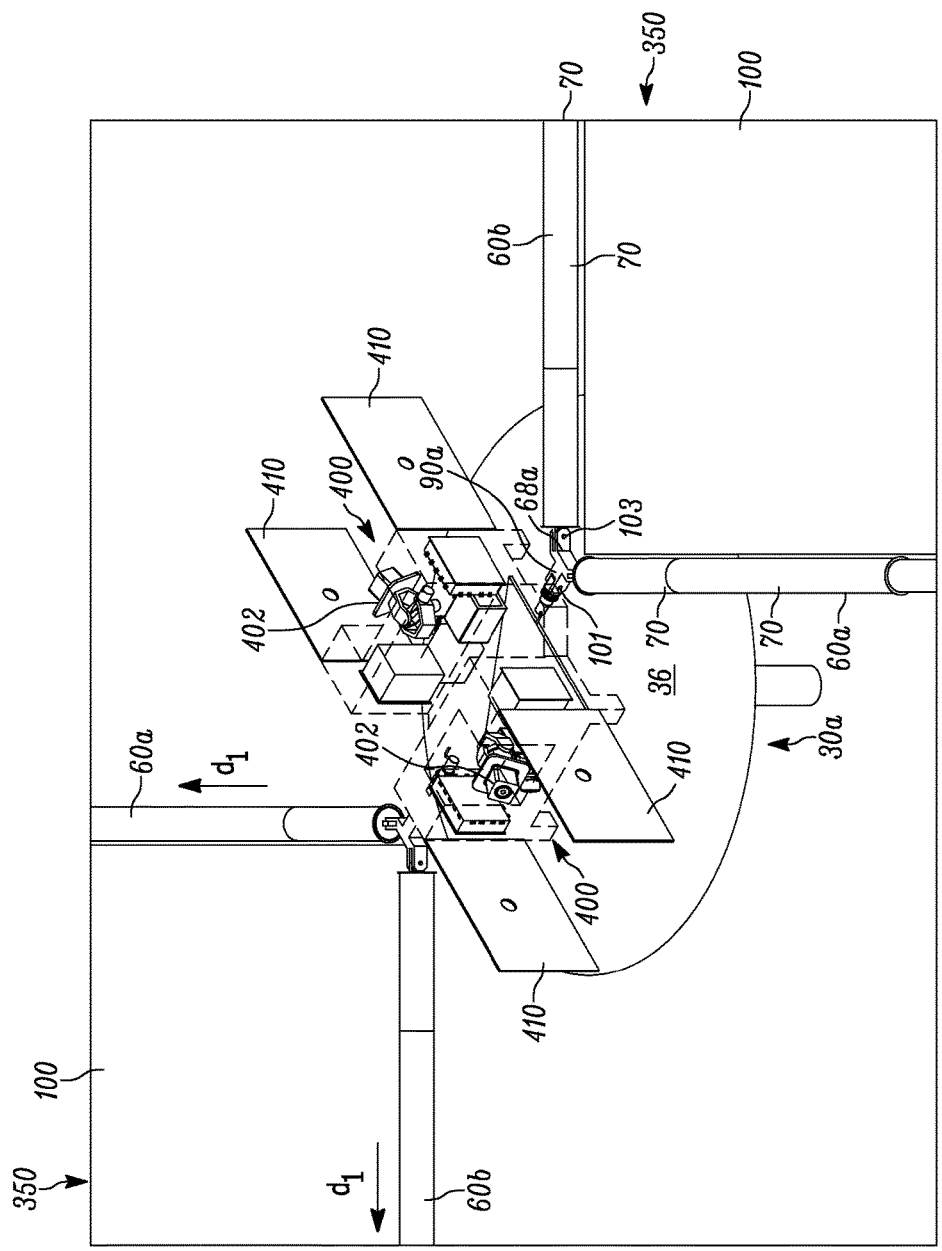

In FIGS. 16A-16C, the supporting booms collectively have a cross-shaped configuration in which four booms 60a, 60b support, deploy, cover, and stow four solar panels 100 in a single solar panel assembly on one side of the spacecraft 30. The first end 62 of each boom 60a, 60b is secured to a bracket 168 to form a cross-shaped structure. Each boom 60a extends substantially perpendicular to two oppositely extending central booms 60b. The booms 60a are therefore coextensive with one another and the booms 60b are coextensive with one another. The edge portions 112 of the solar panels 100 are secured to the booms 60a in the same manner as the solar panel is secured to the boom 60a in FIGS. 8-11. Similarly, the edge portions 114 of the solar panels 100 are secured to the central booms 60b in the same manner as the solar panel 100 is secured to the boom 60b in FIGS. 8-11. Referring to FIG. 16C, the stowed booms 60a, 60b extend parallel one another to form the protective cover for the solar panels 100. Consequently, in this configuration the solar panels 100 are fully compressed and stowed between the booms 60a, 60b. As shown, the stowed booms 60a, 60b and solar panels 100 form a rectangular array, although other configurations can be formed.

To deploy the solar panels 100, the booms 60a, 60b are all pivoted about the bracket (not shown) away from one another, e.g., in a radially outward direction from the center of the array, in the direction indicated by the arrow $d_2$ in FIG. 16C. Each boom 60a, 60b pivots about 900 until the booms all reside in the same plane (see FIGS. 16A-16B). Once the booms 60a, 60b reach the co-planar configuration, the booms 60a are sequentially or simultaneously extended in the direction $d_1$ to expand the solar panels about their hinges 120. Subsequently extending the central booms 60b in the direction $d_1$ (sequentially or simultaneously) expands the four solar panels 100 about their corrugations 110 until the solar panel assemblies 250 reach the fully deployed condition shown.

FIGS. 17-20D are schematic illustrations of an alternative solar panel assembly 350 secured to a spacecraft 30a. The solar panel assembly 350 and spacecraft 30a are similar to the solar panel assembly 50 and spacecraft 30 of FIG. 1. The solar panel assemblies 350 have a deployed condition illustrated in FIGS. 17-19. The booms 60a, 60b of each solar panel assembly 350 are formed from circular, telescoping tubes 70. Each solar panel 100 secured to the booms 60a, 60b can have an area of, for example, about 223 $m^2$ when fully tensioned. Each bracket 68a is integrally formed with each respective connecting arm 90a, 90b. The connecting arm 90a is longer than the connecting arm 90b for reasons to be discussed. A hinge pin 101 pivotably connects each connecting arm 90a, 90b to the spacecraft 30a. A hinge pin 103 pivotably connects each boom 60a, 60b to each bracket 68a.

Figure 19:
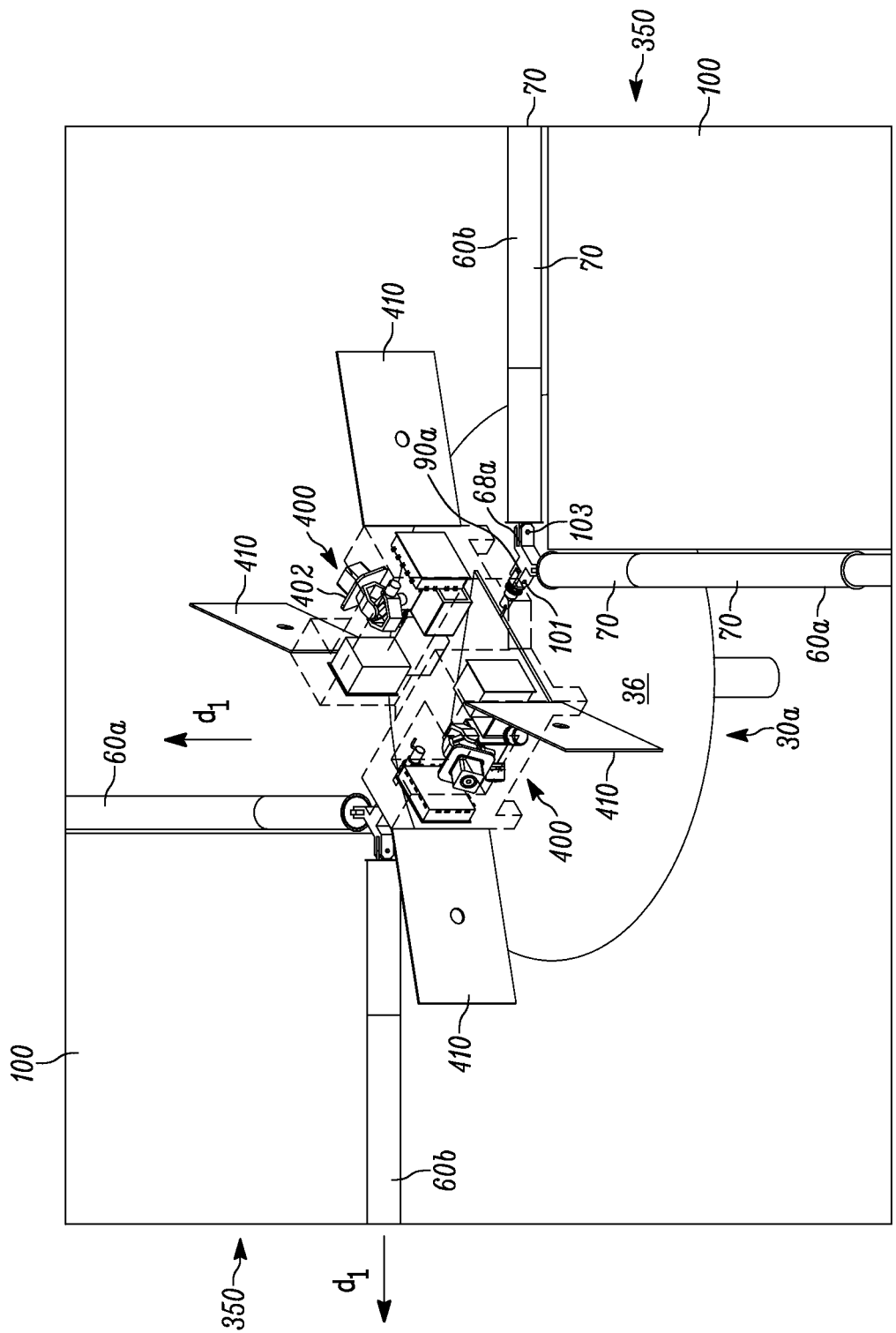
Figure 20A:
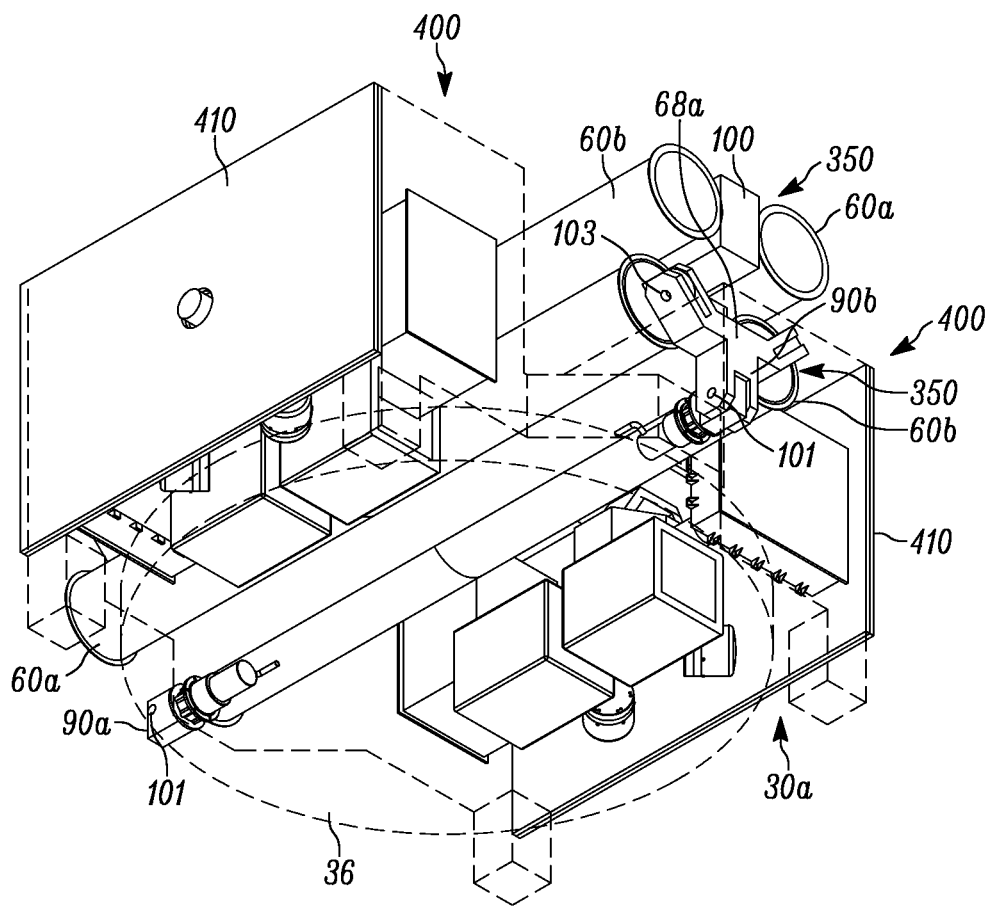
Figure 20B:
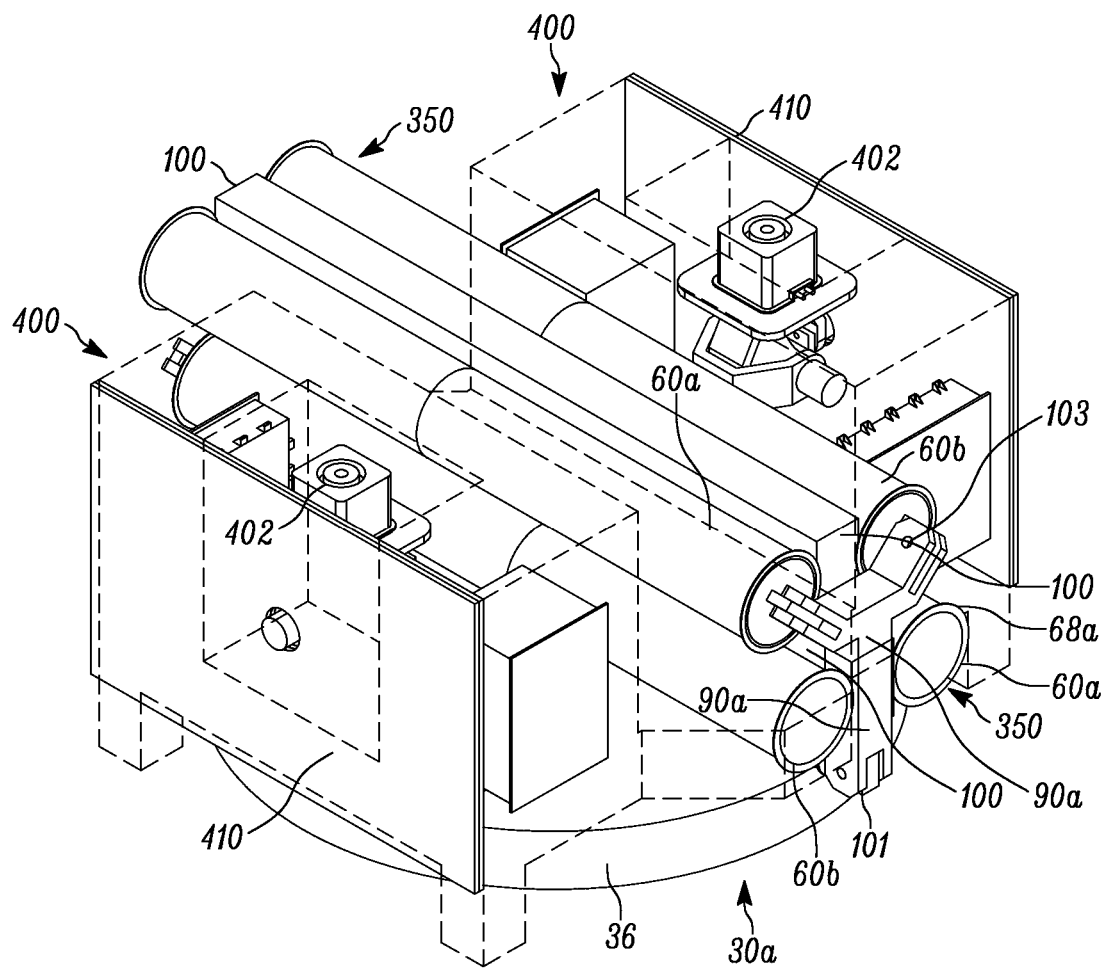
Figure 20C:
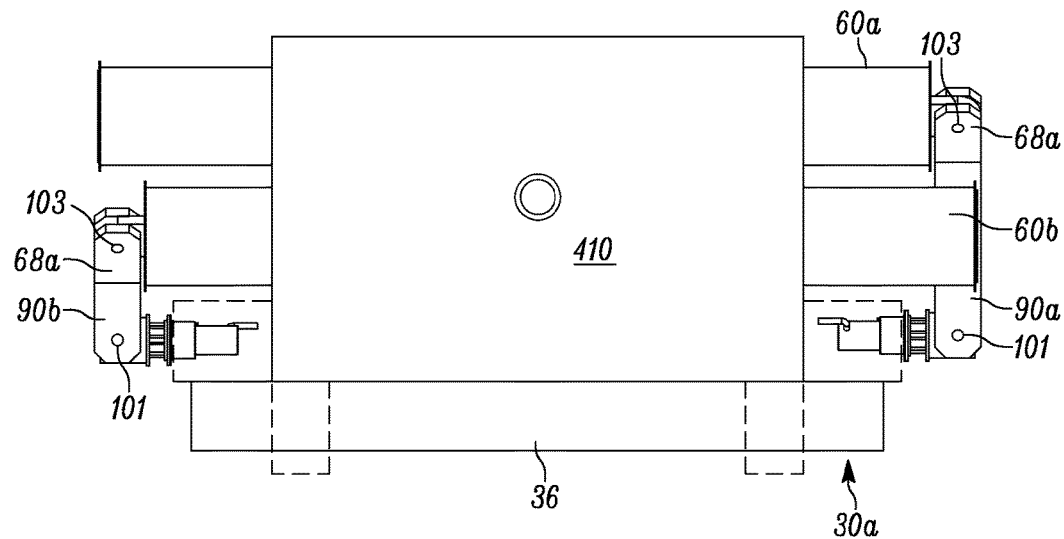
Figure 20D:
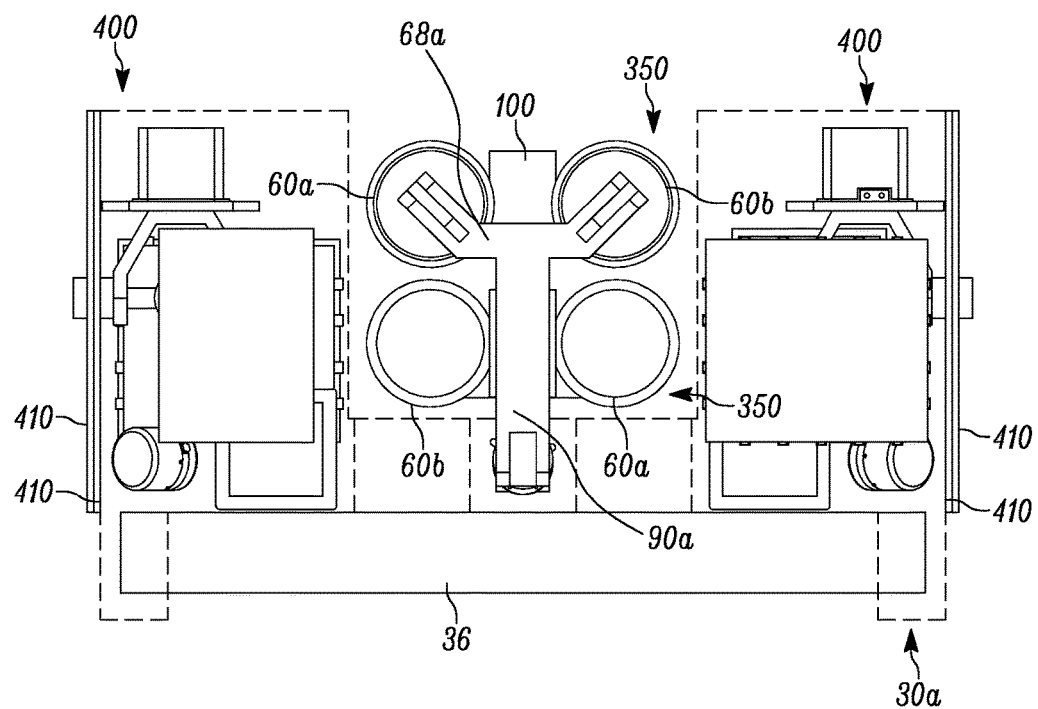

When present, each SEP system 400 includes a thruster 402 and a pair of radiators 410 on opposite sides of each thruster extending generally between the solar panel assemblies 350. The radiators 410 can extend parallel to one another (FIG. 18) or be angled relative to one another (FIG. 19). The radiators 410 can extend, for example, at about 30° or about 45° relative to one another. The radiators 410 are pivoted inward to a stowed condition (FIGS. 20A-20B) overlying one another prior to deploying the solar panel assemblies 350. The thrusters 402 are pivoted downward to a deployed condition (FIGS. 18-19) when the SEP system 400 is needed to propel the spacecraft 30a. With the adjustable thrusters 402 and radiators 410, the SEP systems 400 can be selectively actuated to propel the spacecraft 30a to an along its orbit without damaging the deployed solar panel assemblies 350.

The solar panel assemblies 350 have a stowed condition illustrated in FIGS. 20A-20D. In this condition, the connecting members 90a, 90b are pivoted upwards relative to the spacecraft 30a. The booms 60a, 60b are pivoted about the hinges 103 and extend substantially perpendicular to the connecting arms 90a, 90b and brackets 68a. The circular booms 60a, 60b of each solar panel assembly 350 extend parallel to one another on opposite sides of the collapsed solar panel 100.

The collapsed solar panel assemblies 350 are positioned on the same side of the spacecraft 30a between the SEP systems 400. As shown in FIGS. 20A-20D, the collapsed solar panel assemblies 350 are stacked atop one another in a compact manner. To this end, the connecting members 90a, 90b are positioned on opposite sides of the spacecraft 30a and are aligned with one another between the SEP systems 400. The connecting members 90a, 90b have different lengths (FIG. 20C), with the longer connecting member 90a extending between the booms 60a, 60b secured to the shorter connecting member 90b (see FIGS. 20B and 20D). The booms 60a, 60b secured to the longer connecting member 90a extend over the booms 60a, 60b secured to the shorter connecting member 90a (see FIG. 20C).

To deploy the solar panel assemblies 350 (FIGS. 18-19), the booms 60a, 60b are pivoted about the hinge pins 103 and the connecting arms 90a, 90b pivoted about the hinge pins 101. The booms 60a, 60b are then extended in the direction $d_1$ to deploy the solar panels 100 to the planar conditions shown in FIG. 17. The deployed solar panels 100, booms 60a, 60b, bracket 68a, and connecting member 90a and 90b, respectively, are generally in the same plane within each solar panel assembly 350.

Figure 21A:
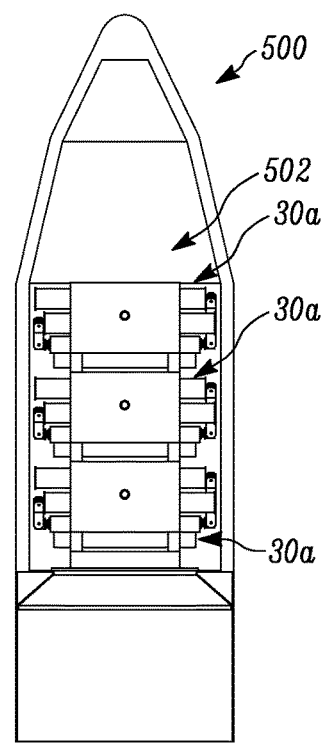
FIGS. 21A-21C are schematic illustrations of a rocket storing a plurality of spacecrafts.
Figure 21B:
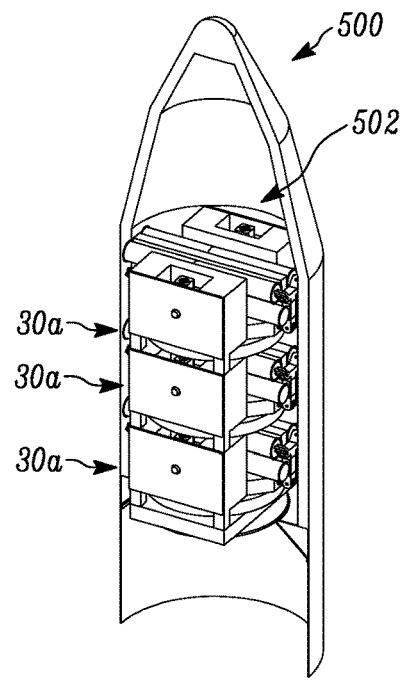
Figure 21C:
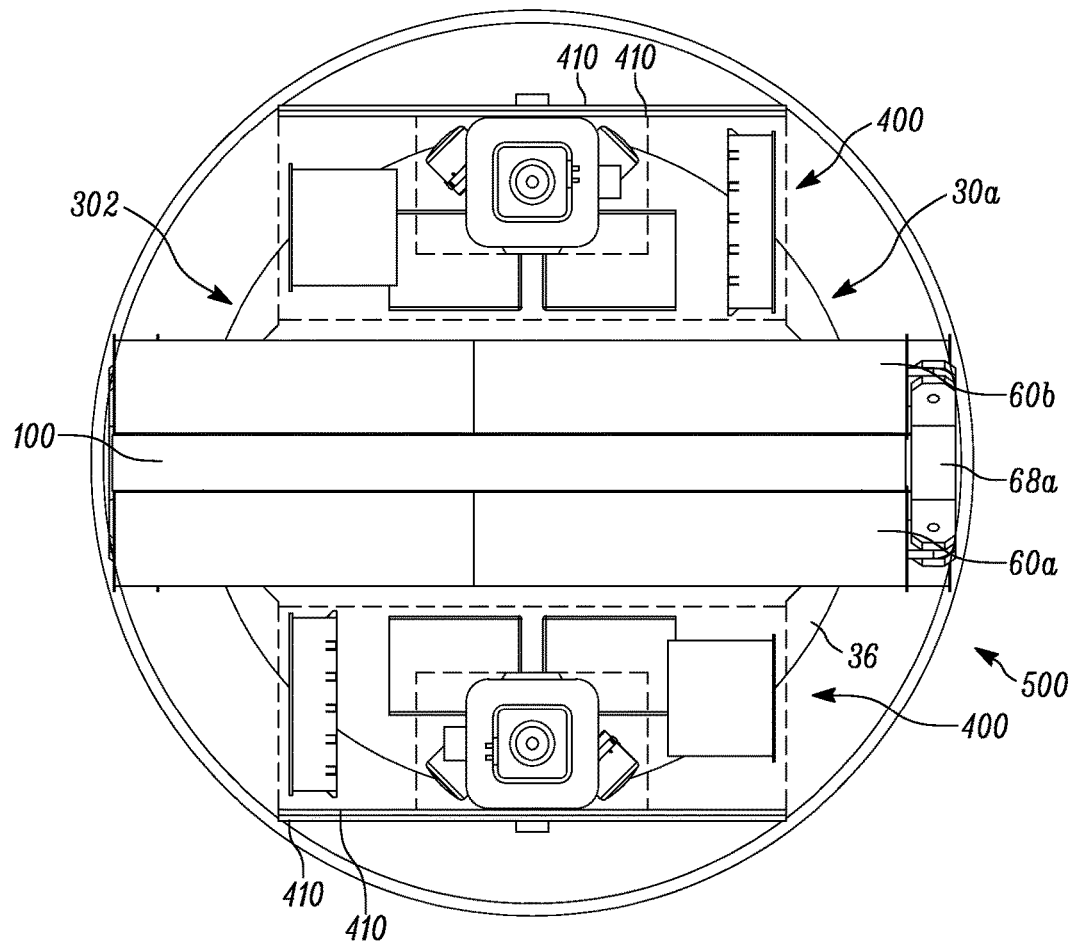

Referring to FIGS. 21A-21C, one or more of the spacecrafts 30a can be stored in the interior space 502 of a rocket 500. The spacecrafts 30a are stacked atop one another along the length of the rocket 500 and released from the rocket in a known manner. It will be understood that any combination and number of the spacecraft 30a and/or the spacecraft 30 of FIGS. 1-20D can be stored in the rocket 500. The compact shape of the stowed solar panel assemblies allows multiple assemblies to be conveniently and reliably stored in the rocket 500.

The solar panel assemblies described herein are advantageous for several reasons. As noted, the tubes form a protective cover for the collapsed solar panels. Furthermore, the modular configuration of the solar panel assemblies is tailored to adjust for a wide range of sizes and scales, depending on the application. Since the booms are telescoping in nature, more or fewer tubes can simply be added to either or both booms to accommodate a larger or smaller solar panel. This allows for an increase in both power and efficiency. The nested size of the stowed booms does not vary significantly as the overall length of the boom changes and, thus, the solar panel assemblies are readily adaptable to meet design criterion without unduly affecting the cost and/or weight of the device. To this end, increasing the tube length provides an exponential increase in solar blanket surface area, compared to conventional linear solar panel support devices in which only a linear surface area increase is achievable. Low cost cells are practical due to this exponential increase in area low efficiency.

Moreover, the triangular configuration of the solar panel(s), coupled with their bidirectional collapsing/deploying features (corrugations and hinges) provides a low moment of inertia that is viable for even the largest solar panel sizes used for electrical propulsion systems. As the solar array gets larger, the telescoping booms merely get longer, thereby increasing the width of the solar array, which minimizes the increase in the moment of inertia and the bending moment on the solar panel assembly. The solar panel assemblies described herein therefore provide a lightweight and cost-efficient solution for deploying very large area solar panels for a spacecraft.

The preferred embodiments of the invention have been illustrated and described in detail. However, the present invention is not to be considered limited to the precise construction disclosed. Various adaptations, modifications and uses of the invention can occur to those skilled in the art to which the invention relates and the intention is to cover hereby all such adaptations, modifications, and uses which fall within the spirit or scope of the appended claims.

Having described the invention, the following is claimed:

1. A solar panel assembly for a spacecraft comprising:
    a bracket;
    first and second booms each having a first end secured to the bracket and a second end extending away from the bracket, each boom being formed from a plurality of tubes that telescope between a stowed condition nested within one another and a deployed condition aligned end-to-end with one another; and a solar panel secured to the first and second booms for receiving solar energy and converting the solar energy to electrical power, the solar panel having a stowed condition collapsed between the first and second booms and a deployed condition extending in a plane between the first and second booms; and wherein the first and second booms and the solar panel when in the stowed condition all extend parallel to one another with the first and second booms forming a protective cover around at least a portion of the stowed solar panel.

2. The solar panel assembly recited in claim 1, wherein the solar panel has a plurality of corrugations for expanding in a first direction and a plurality of hinges for expanding in a second direction perpendicular to the first direction.

3. The solar panel assembly recited in claim 1, wherein the solar panel is triangular when in the deployed condition.

4. The solar panel assembly recited in claim 1, wherein the first and second booms extend perpendicular to one another when in the deployed condition.

5. The solar panel assembly recited in claim 1, wherein the plurality of tubes are rectangular.

6. The solar panel assembly recited in claim 1 further comprising a connecting arm having a first end for connecting to the spacecraft and a second end connected to the bracket.

7. The solar panel assembly recited in claim 6 further comprising a first hinge for pivotably connecting the first end of the connecting arm to the spacecraft and a second hinge for pivotably connecting the second end of the connecting arm to the bracket.

8. The solar panel assembly recited in claim 1 further comprising a third boom having a first end secured to the bracket and a second end extending away from the bracket, the third boom being formed from a plurality of tubes that telescope between a stowed condition nested within one another and a deployed condition aligned end-to-end with one another, the first, second and third booms collectively forming a T-shaped structure; and a second solar panel secured to the second and third booms for receiving solar energy and converting the solar energy to electrical power, the second solar panel having a stowed condition collapsed between the second and third booms and a deployed condition extending in a plane between the second and third booms.

9. The solar panel assembly recited in claim 8, wherein the second solar panel has a plurality of corrugations for expanding in a first direction and a plurality of hinges for expanding in a second direction perpendicular to the first direction.

10. The solar panel assembly recited in claim 1 further comprising:

plates secured to each boom and positioned between each boom and the solar panel; and at least one releasable fastener securing the plates together when the first and second booms are in the stowed condition to prevent relative movement between the booms.

11. The solar panel assembly recited in claim 10, wherein the at least one fastener is releasable to allow for relative pivotable movement between the booms to allow the solar panel to reach the deployed condition.

12. A solar panel assembly for a spacecraft comprising:
a bracket;

first and second booms each having a first end secured to the bracket and a second end extending away from the bracket, the booms being formed from a plurality of rectangular tubes that telescope between a stowed condition nested within one another and a deployed condition aligned end-to-end with one another with the first boom extending perpendicular to the second boom; and a triangular solar panel secured to the first and second booms for receiving solar energy and converting the solar energy to electrical power, the solar panel having a stowed condition collapsed between the first and second booms and a deployed condition extending in a plane between the first and second booms, wherein the first and second booms extend parallel to one another and form a protective cover around the solar panel when the solar panel is in the stowed condition; and wherein the first and second booms and the solar panel all extend parallel to one another when in the stowed condition.

13. The solar panel assembly recited in claim 12, wherein the solar panel has a plurality of corrugations for expanding in a first direction and a plurality of hinges for expanding in a second direction perpendicular to the first direction.

14. The solar panel assembly recited in claim 12 further comprising a connecting arm having a first end for connecting to the spacecraft and a second end connected to the bracket.

15. The solar panel assembly recited in claim 14 further comprising a first hinge for pivotably connecting the first end of the connecting arm to the spacecraft and a second hinge for pivotably connecting the second end of the connecting arm to the bracket.

16. The solar panel assembly recited in claim 12 further comprising a third boom having a first end secured to the bracket and a second end extending away from the bracket, the third boom being formed from a plurality of rectangular tubes that telescope between a stowed condition nested within one another and a deployed condition aligned end-to-end with one another, the first, second and third booms collectively forming a T-shaped structure; and a second solar panel secured to the second and third booms for receiving solar energy and converting the solar energy to electrical power, the second solar panel having a stowed condition collapsed between the second and third booms and a deployed condition extending in a plane between the second and third booms.

17. The solar panel assembly recited in claim 16, wherein the second solar panel has a plurality of corrugations for collapsing in a first direction and a plurality of hinges for collapsing in a second direction perpendicular to the first direction.

18. A spacecraft comprising:
a pair of solar panel assemblies, each comprising:
a bracket;
first and second booms each having a first end secured to the bracket and a second end extending away from the bracket, each boom being formed from a plurality of tubes that telescope between a stowed condition nested within one another and a deployed condition aligned end-to-end with one another;

a solar panel secured to the first and second booms for receiving solar energy and converting the solar energy to electrical power, the solar panel having a stowed condition collapsed between the first and second booms and a deployed condition extending in a plane between the first and second booms; and connecting arms pivotably connected with each bracket and pivotably connected to the spacecraft such that the solar panel assemblies are movable to positions stacked atop one another on the spacecraft; and wherein the first and second booms and the solar panel all extend parallel to one another when in the stowed condition.

19. The spacecraft recited in claim 18, wherein the connecting arms have different lengths such that the solar panel assemblies are stacked on the same side of the spacecraft.

* * * * *